United States Patent
Ohmi et al.

(10) Patent No.: US 7,367,241 B2
(45) Date of Patent: May 6, 2008

(54) DIFFERENTIAL PRESSURE TYPE FLOWMETER AND DIFFERENTIAL PRESSURE TYPE FLOW CONTROLLER

(75) Inventors: Tadahiro Ohmi, 1-17-301, Komegahukuro 2-chome, Aoba-ku, Sendai-shi, Miyagi 9800813 (JP); Kazuhiko Sugiyama, Yamanashi (JP); Tomio Uno, Osaka (JP); Nobukazu Ikeda, Osaka (JP); Kouji Nishino, Osaka (JP); Osamu Nakamura, Osaka (JP); Ryousuke Dohi, Osaka (JP); Atsushi Matsumoto, Osaka (JP)

(73) Assignees: Fujikin Incorporated, Osaka-shi (JP); Tadahiro Ohmi, Sendai-shi (JP)

( * ) Notice: Subject to any disclaimer, the term of this patent is extended or adjusted under 35 U.S.C. 154(b) by 18 days.

(21) Appl. No.: 10/563,226

(22) PCT Filed: Jun. 18, 2004

(86) PCT No.: PCT/JP2004/008596

§ 371 (c)(1),
(2), (4) Date: Jun. 9, 2006

(87) PCT Pub. No.: WO2005/003694

PCT Pub. Date: Jun. 18, 2004

(65) Prior Publication Data

US 2006/0236781 A1    Oct. 26, 2006

(30) Foreign Application Priority Data

Jul. 3, 2003  (JP) ............................ 2003-190988

(51) Int. Cl.
G01F 1/37     (2006.01)
(52) U.S. Cl. ................................ 73/861.52

(58) Field of Classification Search .............. 73/861.52
See application file for complete search history.

(56) References Cited

U.S. PATENT DOCUMENTS 2,549,622 A * 4/1951 Nash et al. .............. 73/861.47
3,701,280 A * 10/1972 Stroman .................. 73/861.02
4,542,993 A * 9/1985 Mims et al. .................. 374/42
4,576,036 A * 3/1986 Huang et al. ............ 73/861.58

FOREIGN PATENT DOCUMENTS

| JP | 53-88757 A | 8/1978 |
| JP | 59-19365 B2 | 5/1984 |
| JP | 59-19366 B2 | 5/1984 |
| JP | 59-52450 B | 12/1984 |
| JP | 61-202120 A | 9/1986 |
| JP | 6-201417 A | 7/1994 |
| JP | 10-055218 A | 2/1998 |
| JP | 2001-201414 A | 7/2001 |
| JP | 2003-195948 A | 7/2003 |

* cited by examiner

*Primary Examiner*—Harshad Patel
(74) *Attorney, Agent, or Firm*—Griffin & Szipl, P.C.

(57) ABSTRACT

A differential pressure type flowmeter comprises an orifice, a detector to detect a fluid pressure $P_1$ on the upstream side of an orifice, a detector to detect a fluid pressure $P_2$ on the downstream side of an orifice, a detector to detect a fluid temperature T on the upstream side of an orifice, and a control computation circuit to compute a fluid's flow rate Q passing through an orifice by using the pressure $P_1$, where $P_2$ and temperature T detected with the aforementioned detectors, and the aforementioned fluid's flow rate Q is computed with the equation $$Q=C_1 \cdot P_1/\sqrt{T} \cdot ((P_2/P_1)^m - (P_2/P_1)^n)^{1/2}$$

(where $C_1$ is a proportional constant, and m and n are constants).

15 Claims, 11 Drawing Sheets

US 7,367,241 B2

DIFFERENTIAL PRESSURE TYPE FLOWMETER AND DIFFERENTIAL PRESSURE TYPE FLOW CONTROLLER

This is a National Phase Application in the United States of International Patent Application No. PCT/JP2004/008596 filed Jun. 18, 2004, which claims priority on Japanese Patent Application No. 2003-190988, filed Jul. 3, 2003. The entire disclosures of the above patent applications are hereby incorporated by reference.

FIELD OF THE INVENTION

The present invention is concerned with improvements in or relating to a differential pressure type flowmeter and differential pressure type flow controller (together hereinafter called a differential pressure type flowmeter and the like) employed for semiconductor manufacturing facilities, at chemical plants, food-products processing plants and the like. The invention may be manufactured at a low cost and with a structural simplicity, and used in a state of so-called inline, and at the same time, make it possible that a flow rate of a fluid either under of criticality or non-criticality is measured or controlled with accuracy and in real time even in a small flow quantity range under a vacuum.

BACKGROUND OF THE INVENTION

Heretofore, for semiconductor manufacturing facilities and at chemical plants, a differential pressure flowmeter and the like such as a mass flow type flowmeter (a thermal type mass flow meter) and the like and a buildup type flowmeter and the like have been widely used to measure or control a flow rate of process gases, raw material gases and the like.

However, with a thermal type mass flowmeter and the like, there have been seen a number of difficulties such as a low responsivity, a poor measuring accuracy in a small flow quantity range, a large number of operational problems, a limited variety of gases subject to control, and being easily influenced by pressure changes and the like.

Similarly, with a buildup type flowmeter and the like, there have been seen some difficulties such as being difficult in measuring or controlling a flow rate in real time, not being able to use in a state of inline, an existence of restraints of a pressure of gases subject to control, a separate line required for measurements and the like.

On the other hand, a differential pressure type flowmeter and the like for which an orifice and a manometer are employed demonstrates excellent effects such as having nearly no restraints of the type of gases subject to control, being usable in a state of incline, and also measuring and controlling a flow rate being able to be performed in real time.

However, this type of a differential pressure type flowmeter and the like uses an equation for a flow rate computation derived from Bernoulli's theorem with the assumption that the fluid is non-compressible, and then the flow rate of the fluid is computed by giving some corrections to it. Therefore, if large pressure changes of the fluid arise (that is, when approximations that the fluid is non-compressible break), a substantial drop in accuracy of measuring and controlling a flow rate cannot be avoided, thus resulting in a failure of accurate flow rate measurements and controls.

To solve these difficulties with the aforementioned differential pressure type flowmeter and the like, a pressure type flowmeter and the like has been developed and disclosed (TOKU-KAI-HEI No. 10-55218 and others) wherewith critical conditions of a fluid passing through an orifice, that is, a pressure $P_1$ on the upstream side of an orifice and a pressure $P_2$ on the downstream side of an orifice being forcibly set to make the velocity of a fluid to be the velocity of sound, and the flow rate of a liquid Q is computed by the theoretical equation $Q=KP_1$ under the critical conditions.

However, even with the pressure type flowmeter and the like, non-critical conditions occur when a fluid is in a small flow quantity range (that is, when a pressure $P_1$ on the upstream side of an orifice and a pressure $P_2$ on the downstream side to an orifice are in a state of being close), thus resulting in large errors in a flow rate measurement value Q or a flow rate control value Q.

Namely, with a conventional differential pressure flowmeter (or a pressure type flowmeter) and the like, it is so made that an equation for a flow rate computation derived from Bernoulli's theorem with the assumption that a fluid is non-compressible is used, and under non-critical conditions before a fluid reaches the velocity of sound (a non-sound velocity range), a flow rate on the downstream side is determined by the equation $$Qc=SC(P_2(P_1-P_2))^{1/2}/T^{1/2},$$

where under critical conditions after having reached the velocity of sound (a sound velocity range), a flow rate Q is computed by an equation $$Qc=SCP_1/T^{1/2}$$

(where T is an absolute temperature of a fluid passing through an orifice, S is a cross-sectional area of an orifice and C is a proportional factor).

Critical conditions for the velocity of a fluid to reach the velocity of sound is given by a critical value $r_c$ of a pressure ratio $P_2/P_1$. The critical value $r_c$ is determined by the equation $$P_2/P_1=r_c=(2//(n+1))^{n/(n-1)}$$

using a specific heat ratio n of a gas.

Furthermore, a specific heat ratio n is given by the equation $$n=Cp/Cv$$

where Cp is a constant pressure specific heat and Cv is a constant volume specific heat. With biatom-molecular gases, n is $$n=7/5=1.4,$$

and $r_c$ is $R_c$=0.53, while with non-linear type triatom-molecular gases, n is $$n=8/6=1.33,$$

and $r_c$ is $R_c$=0.54.

To solve problems with the aforementioned conventional differential pressure type flowmeter (or a pressure type flowmeter), a flow rate value computed with the previous theoretical flow rate equation derived from the assumption that a fluid to be used under non-critical conditions is non-compressible is compared with the actually measured flow rate value, to derive an empirical flow rate equation having a plurality of parameters $$Qc'=SC/T^{1/2} \cdot P_2^m(P_1-P_2)^n=KP_2^m(P_1-P_2)^n$$

from a previous theoretical flow rate equation $$Qc=SC/T^{1/2}(P_2(P_1-P_2))^{1/2},$$

and to determine the aforementioned parameters m and n to make a flow rate value computed by the empirical flow rate equation Qc' equal to a measured value, thus an empirical flow rate equation Qc' that suitably matches with the fluid of compressibility being introduced by inventors of the present invention, and disclosed in TOKU-GAN No. 2001-399433.

With the aforementioned empirical flow rate equation Qc', a proportional constant K is given by $SC/T^{1/2}$ and computed from conditions of substance and absolute temperature T. $P_1$ designates a pressure on the upstream side of an orifice and $P_2$ a pressure on the downstream side of an orifice. kPaA (kilo Pascal Absolute pressure) is the unit. Further, in the measured flow rate range of 10-30 sccm (a unit of a flow rate in a normal state), it has been found that parameters m and n are m=0.47152 and n=0.59492 respectively.

The values of the aforementioned 2 parameters m and n have a dependence on the range of a flow rate to be measured and the type of a gas. The aforementioned values m=0.4715 and n=0.59492 are values that hold true when the flow rate is in the range of 10-30 sccm. So, m and n don't hold true when the range of a flow rate is 10-100 sccm or 100-1000 sccm, and accordingly they deviate from these values.

FIG. 14 is a block diagram of an improved pressure flow controller for which the aforementioned empirical flow rate equation Qc'. This was previously disclosed by inventors of the present invention in the TOKU-GAN No. 2001-399433. The controller in the FIG. 14 is constituted as a flow controller. However, it is easily understood that it can be turned to be a differential pressure type flowmeter by eliminating a control valve 21, a valve driving part 22, and a flow rate comparison part 23e.

Referring to FIG. 14, 20 designates an orifice, 21 designates a control valve, 22 designates a valve driving part, 23 designates a control circuit, 23a designates a pressure ratio computation part, 23b designates a pressure ration computation part, 23c designates a flow rate computation part, 23d designates a flow rate computation part, 23e designates a flow rate comparison part, $P_1$ designates a fluid pressure detector on the upstream side of an orifice, $P_2$ designates a fluid pressure detector on the downstream side of an orifice, T designates a fluid temperature detector, Qs designates a flow rate setting value signal, ΔQ designates a flow rate difference signal, and Qc' designates a flow rate computation value.

With the controller, firstly a pressure ratio $P_2/P_1$ is computed with the detected upstream side pressure $P_1$ and downstream side pressure $P_2$ (23a), a judgment is made continually to find if the fluid is under critical conditions or non-critical conditions (23b), and the flow rate is computed with a flow rate equation Qc=KP when under critical conditions (23c), while the flow rate is computed with an empirical flow rate equation $$Qc'=KP_2{}^m(P_1-P_2)^n$$

when under non-critical conditions.

As stated above, the value of critically rc is given by an equation $(2/(n+1))^{n/(n-1)}$, (where n is the specific heat ratio of a gas). With bi-atom molecular gases, rc is rc=0.53 and with non-linear tri-atom molecular gases, rc is rc=0.54. Therefore, rc is written as rc=approx. 0.5.

A flow rate difference ΔQ between a set flow rate Qs and a computed flow rate Qc is computed with a flow rate comparison part 23e to operate a valve driving part 22 to control valve 21 so that the flow rate difference ΔQ reaches zero. However, when it is used as a flow meter, as stated above, a flow rate comparison part 23e, a control valve 21 and a valve driving part 22 can be eliminated.

Curve A in FIG. 15 shows flow rate measurements or flow rate control characteristics with an improved pressure type flowmeter and the like, while Curve B shows flow rate measurements or flow rate control characteristics with an conventional pressure type flowmeter and the like when an equation $Qc=KP_1$ is used under non-critical conditions. As apparent from FIG. 15, with the improved pressure type flowmeter and the like, a flow rate equation $Qc=KP_1$ is used when under critical conditions, while an empirical flow rate equation $$Qc'=KP_2{}^m(P_1-P_2)^n$$

is used when under non-critical conditions, thus an accurate flow rate Q in proportion to the set flow rate being able to be computed, linearity to a set % of a flow rate being held as shown by Curve A in FIG. 15, and the comparatively accurate flow rate measurement and control being ensured even in the range of a small flow quantity.

Patent Literature 1: TOKU-KOU-SHO No. 59-19365 Public Bulletin

Patent Literature 2: TOKU-KOU-SHO No. 59-19366 Public Bulletin

Patent Literature 3: TOKU-KAI-HEI No. 10-55218 Public Bulletin

DISCLOSURE OF THE INVENTION

Object of the Invention

With the aforementioned pressure type flowmeter and the like shown in FIG. 14, flow rate measurements or control can be achieved with comparatively high accuracy if the flow rate is in a small flow quantity range up to approximately 10% of the maximum flow rate as shown by Curve A in FIG. 15, thus excellent practical effects being attained.

However, when a flow rate is in a small flow quantity range of less than approximately 10% of the maximum flow rate, problems that a practical flow rate measurements or flow rate control cannot be achieved with accuracy arise in reality.

Furthermore, with the improved pressure type flowmeter and the like, a measurement error (% SP or %FS) becomes comparatively larger to the reference set flow rate when a pressure $P_2$ on the downstream side of an orifice becomes vacuum of less than approximately 200 Torr, thus resulting in occurrence of difficulties in practical use.

It is an object of the present invention to provide a differential pressure type flowmeter and the like at a low cost and simple in structure to solve the problems with an improved pressure type flowmeter and the like previously developed by inventors of the present invention, thus making it possible to achieve highly accurate flow rate measurements or control over a wide flow rate range from the maximum flow rate (100%) to approximately 1% of the maximum flow rate, and even when a pressure $P_2$ on the downstream side of an orifice is in the vacuum and makes changes, by storing the error data obtained by actual measurements beforehand in the memory device, and then by correcting flow rate computation values in reference with the correction data.

Means to Achieve the Object

The present invention, according to a first embodiment, is fundamentally so constituted, with a differential pressure type flowmeter comprising an orifice, a detector to detect a fluid pressure $P_1$ on the upstream side of an orifice, a detector to detect a fluid pressure $P_2$ on the downstream side of an orifice, a detector to detect a fluid temperature T on the upstream side of an orifice, and a control computation circuit to compute a fluid's flow rate passing through an orifice with the pressure $P_1$, pressure $P_2$ and temperature T detected by the aforementioned detectors, the aforementioned fluid's flow rate Q is computed with an equation $$Q = C_i \cdot P_1 / \sqrt{T} \cdot ((P_2/P_1)^m - (P_2/P_1)^n)^{1/2}$$

(where $C_1$ is a proportional constant, and m and n are constants).

The present invention, according to a second embodiment, is fundamentally so constituted, with a differential pressure type flowmeter comprising an orifice, a detector to detect a fluid pressure $P_1$ on the upstream side of an orifice, a detector to detect a fluid pressure $P_2$ on the downstream side of an orifice, a detector to detect a fluid temperature T on the upstream side of an orifice, and a control computation circuit to compute a fluid's flow rate Q passing through an orifice with the pressure $P_1$ and pressure $P_2$ and temperature T detected by the aforementioned detectors, the aforementioned control computation circuit is installed with a flow rate computation circuit wherewith a fluid's flow rate Q is computed with an equation $$Q = C_1 \cdot P_1 / \sqrt{T} \cdot ((P_2/P_1)^m - (P_2/P_1)^n)^{1/2}$$

(where $C_1$ is a proportional constant, and m and n are constants), a correction data memory circuit wherein changes in the pressure $P_2$ on the downstream side of an orifice obtained by actual measurements beforehand and flow rate errors of the aforementioned fluid's flow rate Q are storable, and a flow rate correction computation circuit to correct the aforementioned computed fluid's flow rate Q with the correction data from the correction data memory circuit, thus the computed fluid's flow rate Q being corrected depending on changes of a pressure $P_2$ on the downstream side of an orifice, to output a corrected flow rate value Q'.

The present invention, according to a third embodiment, further modifies the second embodiment so that, by installing, with a control computation circuit, a pressure ratio computation circuit to compute the ratio of a fluid pressure $P_1$ on the upstream side of an orifice and a fluid pressure $P_2$ on the downstream side of an orifice, a critical condition judgment circuit to judge a state of the fluid by comparing the aforementioned computed pressure ratio and a fluid's critical pressure ratio, and a No. 2 flow rate computation circuit to compute the fluid's flow rate Q by using the equation $Q = KP_1$ (where K is a proportional constant) when the fluid is under critical conditions, thus outputting a fluid's flow rate Q computed with the aforementioned No.2 flow rate computation circuit when the fluids is under critical conditions, and also outputting a fluid's flow rate value Q' corrected with the flow rate correction computation circuit when the fluid is under non-critical conditions.

The present invention, according to a fourth embodiment, is fundamentally so constituted that flow rate measurements can be performed with high accuracy over the wide flow rate range by combining a differential pressure type flowmeter for measuring a flow rate range of 100%-10% of the maximum flow rate range and a differential pressure type flowmeter for measuring a flow rate range of 10%-1% of the maximum flow rate range and by switching a fluid to be measured in accordance with the aforementioned flow rate ranges using a switching valve, to supply the fluid to the aforementioned differential pressure type flowmeters.

The present invention, according to a fifth embodiment, further modifies the fourth embodiment so that both differential pressure type flowmeters are made to be differential pressure type flowmeters comprising an orifice, a detector to detect a fluid pressure $P_1$ on the upstream side of an orifice, a detector to detect a fluid pressure $P_2$ on the downstream side of an orifice, a detector to detect a fluid temperature T on the upstream side of an orifice, and a control computation circuit to compute a fluid's flow rate by using the pressure $P_1$, pressure $P_2$, and temperature T detected by the aforementioned detectors, and the aforementioned fluid's flow rate Q is computed with the equation $$Q = C_1 \cdot P_1 / \sqrt{T} \cdot ((P_2/P_1)^m - (P_2/P_1)^n)^{1/2}$$

(where $C_1$ is a proportional constant, and m and n are constants).

The present invention, according to a sixth embodiment, further modifies the fourth embodiment so so that both differential pressure type flowmeters are made to be differential pressure type flowmeters comprising an orifice, a detector to detect a fluid pressure $P_1$ on the upstream side of an orifice, a detector to detect a fluid pressure $P_2$ on the downstream side of an orifice, a detector to detect a fluid temperature T on the upstream side of an orifice, and a control computation circuit to compute a fluid's flow rate by using the pressure $P_1$, pressure $P_2$, and temperature T detected by the aforementioned detectors; and the aforementioned control computation circuit is equipped with a flow rate computation circuit wherewith a fluid's flow rate Q is computed with the equation $$Q = C_1 \cdot P_1 / \sqrt{T} \cdot ((P_2/P_1)^m - (P_2/P_1)^n)^{1/2}$$

(where $C_1$ is a proportional constant, and m and n are constants), a correction data memory circuit wherein changes of a pressure $P_2$ on the downstream side of an orifice obtained by actual measurements beforehand and flow rate errors of the aforementioned fluid's flow rate Q is stored, and a flow rate correction computation circuit to correct the aforementioned computed fluid's flow rate Q with the correction data from the correction data memory circuit, thus computed fluid's flow rate Q being corrected depending on changes of a pressure $P_2$ on the downstream side of an orifice to output a corrected flow rate value Q'.

The present invention, according to a seventh embodiment, is fundamentally so constituted by forming it with a valve body 12 provided with a fluid inlet a, a fluid outlet b, a mounting hole 17a for the No. 1 switching valve 10, a mounting hole 17b for the No.2 switching valve 11, a mounting hole 18a for a fluid pressure detector 2 on the upstream side of an orifice, a mounting hole 18b for a fluid pressure detector 3 on the downstream side of an orifice, a mounting hole for a fluid temperature detector 4 on the upstream side of an orifice, fluid passages 16a, 16b and 16e for directly passing through a fluid inlet a, the undersides of a mounting hole 17a for the No.1 switching valve 10, a mounting hole 18a for a fluid pressure detector 2 on the upstream side of an orifice and a mounting hole 17b for the No.2 switching valve 11 which are made in the interior of the aforementioned valve body 12, a fluid passage 16f for communication of the underside of a mounting hole 17a for the No.1 switching valve 10 and the underside of a mounting hole 17b for the No.2 switching valve 11, a fluid passage 16c for communication of the underside of a mounting hole 17b for the No.2 switching valve 11 and the underside of a mounting hole 18b for the fluid pressure detector 3 on the downstream side of an orifice, a fluid passage 16d for communication of the underside of a mounting hole 18b for the fluid pressure detector 3 on the downstream side of an orifice and a fluid outlet b, a fluid pressure detector 2 on the upstream side of an orifice and a fluid pressure detector 3 fixed to the aforementioned mounting holes 18a and 18b respectively, a fluid temperature detector 4 on the upstream side of an orifice, the No.1 switching valve 10 wherewith opening and closing are conducted between the aforementioned fluid passage 16e and fluid passage 16f, the No.2 switching valve 11 wherewith opening and closing are conducted between the aforementioned fluid passage 16b and fluid passage 16c, an orifice 1' for a small flow quantity installed halfway to the aforementioned fluid passage 16f, an orifice 1" for a large flow quantity installed on the aforementioned fluid passage 16a or fluid passage 16b, and a control computation circuit to compute a fluid's flow rate Q passing through an orifice 1' for a small flow quantity and an orifice 1" for a large flow quantity depending on the pressure $P_1$, pressure $P_2$ and temperature T detected by the aforementioned pressure detectors 2 and 3 and temperature detector 4 respectively by using the equation $$Q=C_1 \cdot P_1/\sqrt{T} \cdot ((P_2/P_1)^m - (P_2/P_1)^n)^{1/2},$$

thus making it possible to measure a flow rate in a large flow quantity range by closing the aforementioned No.1 switching valve 10 and opening the No.2 switching valve 1, while a flow rate in a small quantity range is measured by opening the aforementioned No.1 switching valve 10 and closing the No.2 switching valve 11.

The present invention, according to an eight embodiment, further modifies the seventh embodiment so that a flow rate range up to 100%-10% of the maximum flow rate is measured by closing the No.1 switching valve 10 and opening the No.2 switching valve 11, while a flow rate range up to 10%-1% of the maximum flow rate is measured by opening the No1 switching valve 10 and closing the No.2 switching valve 11.

The present invention, according to a ninth embodiment, further modifies the fourth or seventh embodiments so that either one of the No.1 switching valve 10 or No.2 switching valve 11 is made to be a normal/close type valve and the other a normal/open type valve, and a operating fluid is supplied from one control electromagnetic valve Mv to driving cylinders 10a and 10b of both switching valves.

The present invention, according to a tenth embodiment, further modifies the seventh or eighth embodiments so that a pressure detector 2 to detect a pressure on the upstream side of an orifice, a pressure detector 3 to detect a pressure on the down stream side of an orifice, and a temperature detector 4 to detect a temperature on the upstream side of an orifice are made sharable with both differential pressure type flowmeters.

The present invention, according to an eleventh embodiment, is characterized in that, with a differential pressure type flow controller comprising a control valve part equipped with a valve driving part, an orifice installed on the downstream side thereof, a detector to detect a fluid pressure $P_1$ on the upstream side of an orifice, a detector to detect a fluid pressure $P_2$ on the downstream side of an orifice, a detector to detect a fluid temperature T on the upstream side of an orifice, and a control computation circuit equipped with a flow rate comparison circuit wherewith a fluid's flow rate Q passing through an orifice is computed by using the pressure $P_1$, pressure $P_2$ and temperature T detected by the aforementioned detectors, and the different between a computed flow rate Q and a set flow rate Qs is computed, the aforementioned fluid's flow rate Q is computed by the equation $$Q=C_1 \cdot P_1/\sqrt{T} \cdot ((P_2/P_1)^m - (P_2/P_1)^n)^{1/2}$$

(where C is a proportional constant, and m and n are constants).

The present invention, according to a twelfth embodiment, is characterized in that, with a differential pressure type flow controller comprising a control valve part equipped with a valve driving part, an orifice installed on the downstream side thereof, a detector to detect a fluid pressure $P_1$ on the upstream side of an orifice, a detector to detect a fluid pressure $P_2$ on the downstream side of an orifice, a detector to detect a temperature T on the upstream side of an orifice, and a control computation circuit equipped with a flow rate comparison circuit wherewith the fluid's flow rate Q is computed by using the pressure $P_1$, pressure $P_2$ and temperature T detected by the aforementioned detectors, and the difference between a computed flow rate Q and set flow rate Qs is computed, the aforementioned control computation circuit is equipped with a flow rate computation circuit wherewith a fluid's flow rate Q is computed by the equation $$Q=C_1 \cdot P_1/\sqrt{T} \cdot ((P_2/P_1)^m - (P_2/P_1)^n)^{1/2}$$

(where $C_1$ is a proportional constant, and m and n are constants), a correction data memory circuit wherein changes of the pressure $P_2$ on the downstream side of an orifice obtained by actual measurements beforehand and flow rate errors of the aforementioned fluid's flow rate Q are stored, a flow rate correction computation circuit to correct the aforementioned computed fluid's flow rate Q with the correction data from the correction data memory circuit, thus a fluid's flow rate Q being corrected depending on the changes of a pressure $P_2$ on the downstream side of an orifice, and the corrected flow rate value Q' being inputted to the aforementioned flow rate comparison circuit to compute the difference of flow rates $$\Delta Q = Q' - Qs$$

The present invention, according to a thirteenth embodiment, further modifies a twelfth embodiment so that, by installing with a control computation circuit a pressure ratio computation circuit to compute the ratio of a fluid pressure $P_1$ on the upstream side of an orifice and a fluid pressure $P_2$ on the downstream side of an orifice, a critical conditions judgment circuit to judge a state of a fluid by comparing the aforementioned computed pressure ratio and a fluid's critical pressure ratio, the No.2 flow rate computation circuit to compute a fluid's flow rate Q by using the equation $Q=KP_1$ (where K is a proportional constant) when the fluid is under critical conditions, a fluid's flow rate Q computed by the aforementioned No.2 fluid computation circuit when the fluid is under critical conditions and a fluid's flow rate value Q' corrected from the flow rate correction computation circuit when the fluid is under non-critical conditions are inputted respectively to the aforementioned flow rate computation circuit.

Effects of the Invention

With the present invention, the structure of a differential pressure type flowmeter and the like is remarkably simplified, and it is so constituted that a flow rate computation is performed by using a novel empirical flow rate computation equation which makes it possible to obtain a computation flow rate value corresponding with the measured value with high accuracy, thus allowing the flowmeter and the like to be manufactured at low cost, and moreover, they take an inline form, and can be used without constraints of fitting positions, and a control flow rate is not influenced nearly at all by pressure changes, enabling highly accurate flow rate measurements or flow rate control in real time.

Also, with the present invention, it is so made that a control computation circuit is equipped with a correction data memory circuit for pressure changes, and a correction circuit for a computation flow rate, thus enabling easy correction even when pressure changes arise on the secondary side of an orifice. Therefore, highly accurate flow rate measurements or flow rate control can be achieved virtually without being influenced by pressure changes even a pressure $P_2$ on the secondary side of an orifice is under a vacuum (a low pressure of less than 50 Torr).

Furthermore, with the present invention, it is so made that a differential pressure type flowmeter for a small flow quantity and a differential pressure type flowmeter for a large flow quantity are organically and integrally assembled. Therefore, highly accurate flow rate measurements with errors (% SP) of less than 1 (% SP) can be performed continuously over a wide flow rate range from the rated flow rate (100%) to a small flow quantity (1%) or approximately 1% of the rated flow rate, by both differential pressure type flowmeters being switched.

In addition, with the present invention, the control system can be further simplified by making the switching operation, for both differential pressure type flowmeter for a small quantity and differential pressure type flowmeter for a large quantity, automatic with a single-system control signal Sc.

As stated above, the present invention achieves excellent, practical effects that all types of gases are measured or controlled over the wide flow rate range with high accuracy even when a gas of less than 100 Torr is used although the differential pressure type flowmeter and the like are structured simply and at low cost.

LIST OF REFERENCE CHARACTERS AND NUMERALS

Figure 1:
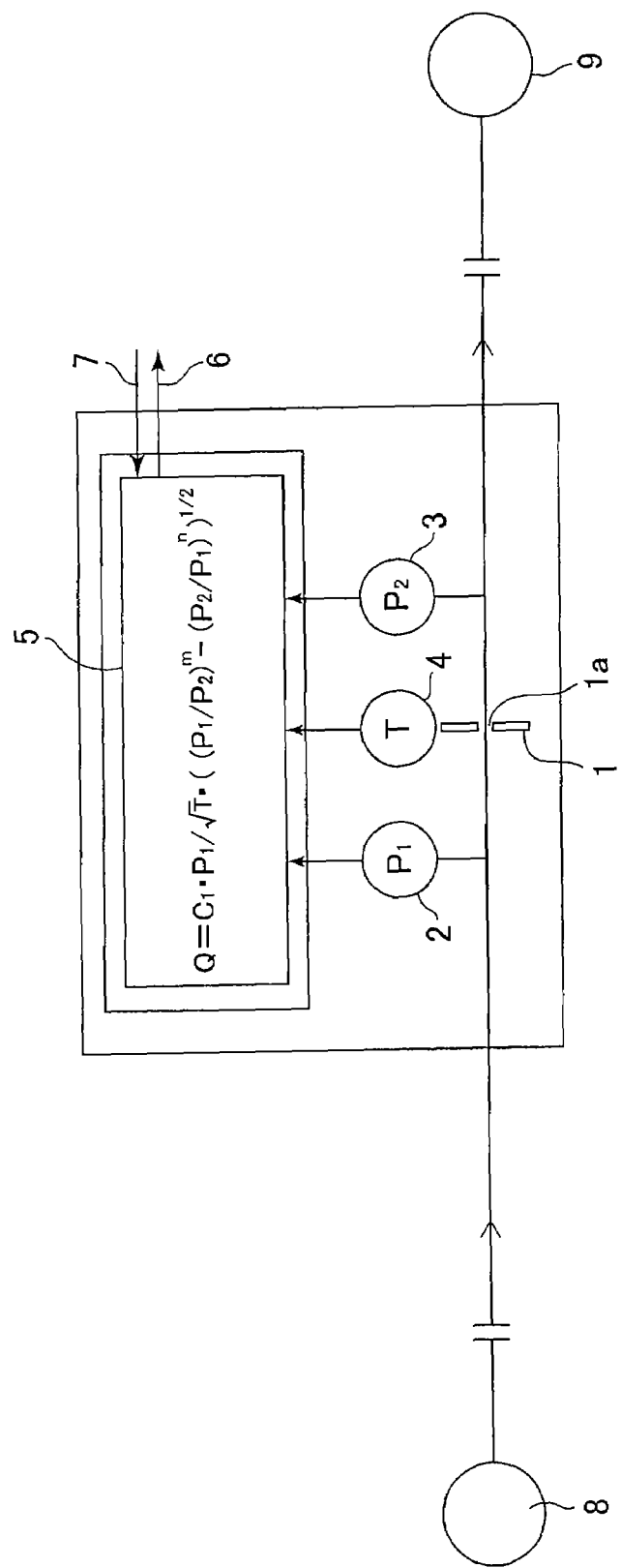
FIG. 1 is a basic block diagram of a differential pressure flowmeter according to the first embodiment of the present invention.

Q designates Empirical flow rate computation equation
Q' designates Corrected flow rate
Qs designates Set flow rate
SF designates a Standard flow controller (a pressure type flow controller)
A designates a Differential pressure type flowmeter
$V_{21}$-$V_{23}$ designate a Control valve on the secondary side
VP designates a Vacuum pump
a designates a Gas inlet
b designates a Gas outlet
1 designates an Orifice
1' designates an Orifice for a small quantity
1" designates an Orifice for a large quantity
2 designates an Absolute pressure type pressure detector on the upstream side of an orifice
3 designates an Absolute pressure type pressure detector on the downstream side of an orifice
4 designates Gas absolute temperature detector on the upstream side of an orifice
5 designates a Control computation circuit
5a designates a Flow rate computation circuit
5b designates a Correction data memory circuit
5c designates a Flow rate correction computation circuit
5e designates a Critical condition judgment circuit
5f designates a Second flow rate computation circuit for computing a flow rate under critical conditions
5g designates a Comparison circuit for a set flow rate and computed flow rate
5' designates a First control computation circuit
5" designates a Second control computation circuit
6 designates a Flow rate output terminal
7 designates a Power input terminal
8 designates a Gas supply facility
9 designates a Gas use facility (a chamber)
10 designates a No.1 switching valve
10a designates a Driving cylinder
11 designates a No.2 switching valve
11a designates a Driving cylinder
12 designates a Body 12a designates a Gas inlet part element
12b designates a Gas outlet part element
12c designates a No.1 body element
12d designates a No.2 body element
13a-13b designate Seals
14a-14b designate Mounting bolts for pressure detectors
15a-15b designate Diaphragm valve mechanisms
16a-16f designate Passages
17a designates a Mounting hole for the No.1 switching valve
17b designates a Mounting hole for the No.2 switching valve
18a designates a Mounting hole for a pressure detector on the upstream side of an orifice
18b designates a Mounting hole for a pressure detector on the downstream side of an orifice
21 designates a Control valve
22 designates a Valve driving part
Mv designates a Control electromagnetic valve
Sc designates a Control signal

BEST MODE TO CARRY OUT THE INVENTION

The following embodiments of the present invention are described hereunder with reference to the drawings.

FIG. 1 is a basic block diagram of a differential pressure type flowmeter according to the first embodiment of the present invention. The differential pressure type flowmeter comprises an orifice 1, an absolute pressure type pressure detector 2 on the upstream side of an orifice, an absolute pressure type pressure detector 3 on the downstream side of an orifice, a gas absolute temperature detector 4 on the upstream side of an orifice, a control computation circuit 5, an output terminal 6, an input terminal 7, and the like. And, 8 designates a gas supply facility and 9 a gas use facility (a chamber).

With the differential pressure type flowmeter according to the present invention, a gas flow rate Q passing through an orifice 1 under differential pressure conditions (that is, under non-critical conditions) is computed by an empirical flow rate equation as the below-stated equation (1), and the computed value is outputted to the outside through the output terminal 6.

$$Q = C_1 \cdot P_1 \cdot T \cdot ((P_2/P_1)^m - (P_2/P_1)^n)^{1/2} \quad (1)$$

The aforementioned empirical flow rate equation Q is what is newly introduced by inventors of the present invention based on the following flow rate equation (2) based on the previously known continuous equation.

$$Qc = \frac{S \cdot P_1}{\delta} \cdot \left( \frac{2g}{RT} \cdot \frac{\kappa}{\kappa - 1} \left( \left(\frac{P_2}{P_1}\right)^{\frac{2}{\kappa}} - \left(\frac{P_2}{P_1}\right)^{\frac{\kappa+1}{\kappa}} \right) \right)^{\frac{1}{2}} \quad (2)$$

With the equation (2), $\delta$ designates a gas density, $\kappa$ a specific ratio of a gas, $P_1$ a pressure on the upstream side of an orifice, $P_2$ a pressure on the downstream side of an orifice, T a gas temperature, R a gas constant, and S a cross-sectional area of an orifice. The equation (2) has been publicly known.

With the aforementioned equation (1) according to the present invention, Q designates a volume flow rate (SCCM) converted to a standard state, C a coefficient including a cross-sectional area S of an orifice 1, $P_1$ an absolute pressure (Pa) on the upstream side of an orifice, $P_2$ an absolute pressure (Pa) on the downstream side of an orifice, and T an absolute temperature (K) on the upstream side of an orifice.

m and n are constants determined by computing $\kappa$ of $N_2$ gas $\kappa=1.40$ with the equation (2). With a flowmeter having an orifice measuring 2.0 mm $\phi$ in diameter $\phi$ and a maximum flow rate of 2000 sccm, $C_1$, m and n in the equation (1) become $C_1=2680$, m=1.4286 and n=1.7143 respectively.

There is no need to say that the constants $C_1$, m and n change depending on the measurable gas type. In the case of the $N_2$ gas, it has been known as m=1.4286 and n=1.7143.

Figure 2:
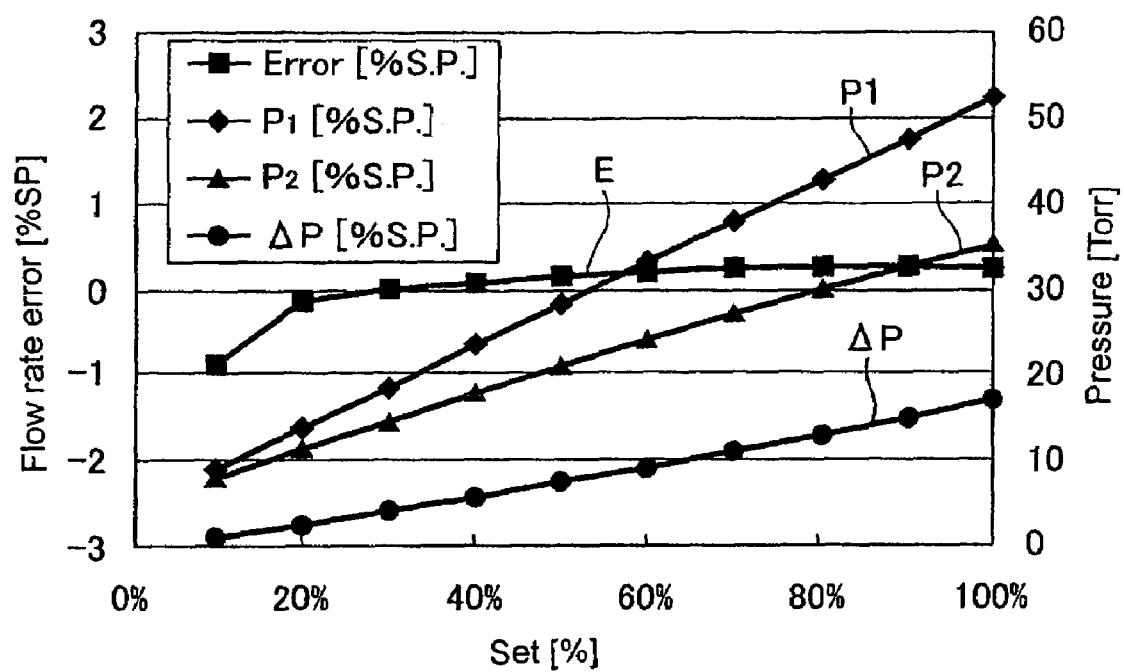
FIG. 2 is a diagram to show error characteristics of a differential pressure type flowmeter in FIG. 1.

FIG. 2 is the measured values to show relationships of a set flow rate value (%), pressure $P_1$ and $P_2$ (Torr) and error (% SP) of a differential pressure type flowmeter (100% set value 2000 sccm) in FIG. 1. Flow rate errors are found to be of extremely minimal values (less than 1% SP) to a set flow rate value (%) if the set flow rate is around 10(%) (10% of the maximum flow rate=200 sccm) even when gas pressures $P_1$ and $P_2$ are under the vacuum of less than 50 Torr.

However, when a set flow rate value is less than 10(%), difficulties arise impractical use because a flow rate error becomes more than −1(% SP) when a set flow rate value is less than 10(%).

Figure 3:
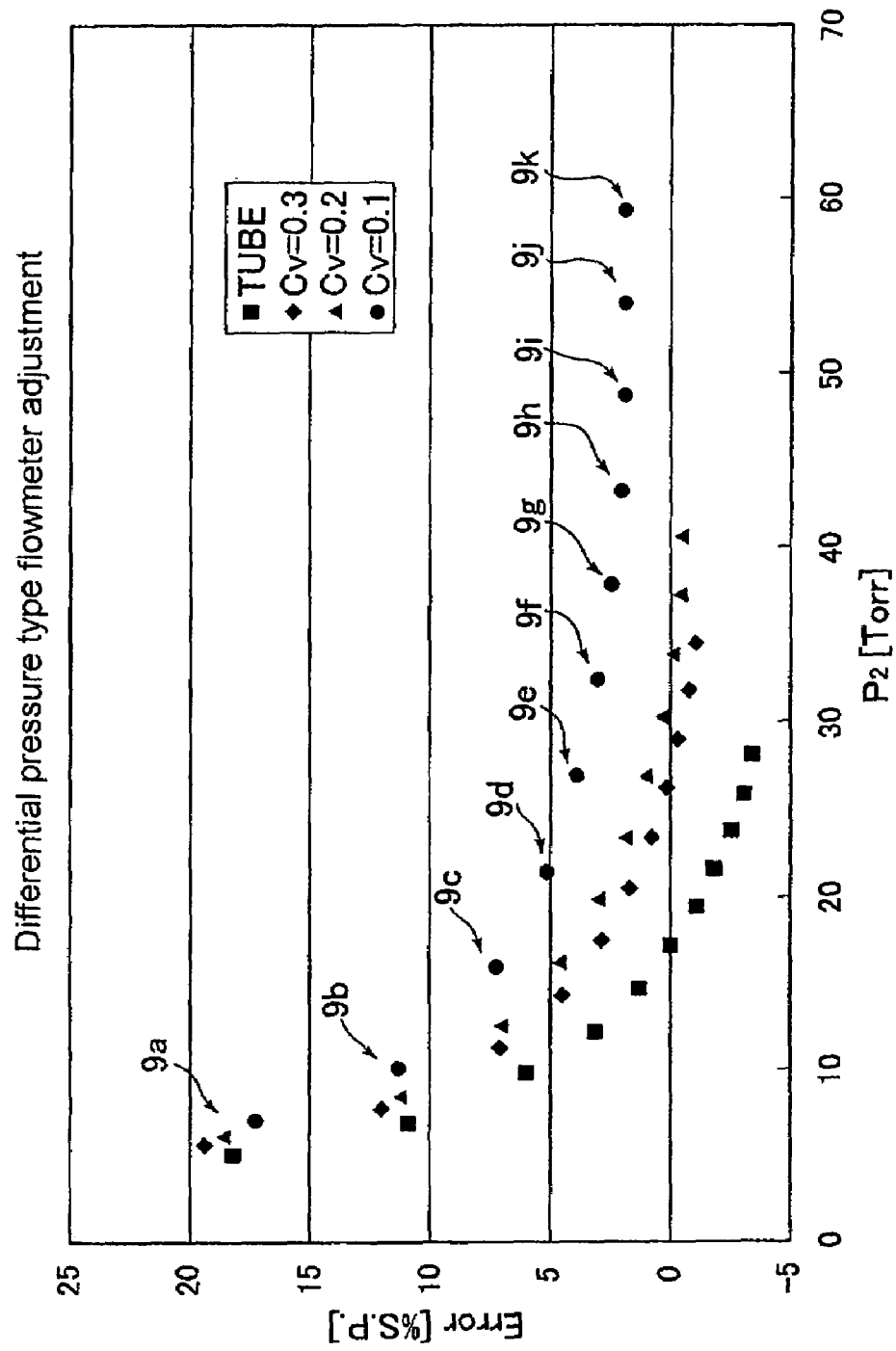
FIG. 3 is a diagram to show the relationships of "a flow rate, the secondary side pressure and error" in the event that the pipe resistance on the secondary side is changed at the time when a pressure $P_2$ on the downstream side of an orifice is the vacuum.

FIG. 3 is a diagram to show relationships of a pressure $P_2$ (Torr) on the secondary side of an orifice, a set flow rate (%), errors (% SP) and piping conditions on the secondary side of a differential pressure type flowmeter according to the present invention, where 9a is in the event that a set flow rate (%) is 100 sccm, 9b 200 sccm, 9c 400 sccm, 9d 600 sccm, 9g 1200 sccm, 9j 1800 scm, and 9k 2000 sccm (100%) respectively, The maximum flow rate (100%) of a differential pressure type flowmeter employed herewith is 2000 sccm.

Among set flow rate values (%), as shown in FIG. 3, square marks show errors (% SP) in the event that a valve and the like are not installed on the pipe passage (4.35 mm $\phi \cdot 100$ mm) on the outlet side of a differential pressure type flowmeter, rhombus marks show errors (% SP) in the event that a control valve with a Cv value of 0.3 on the outlet side of a differential pressure type flowmeter is installed, and triangle marks show errors (% SP) in the event that a control valve with a Cv value of 0.2 is installed, and circle marks show errors (% SP) in the event that a control valve with a Cv value of 0.1 is installed respectively.

Namely, as apparent from FIG. 3, when pressure conditions in use are in the vacuum (less than 50 Torr), relationships of a pressure $P_2$ and a flow rate Q change substantially depending on piping conditions on the secondary side (the downstream side of an orifice), thus resulting in changing errors (% SP).

Therefore, at the time of adjustments of a differential pressure type flowmeter, flow rate errors (% SP) are measured in advance for cases wherein the secondary side pipe resistance (a conductance is changed (with 4 conditions and at 11 points in the case of FIG. 3), and correction coefficients to cancel the errors are obtained in advance. Thus, by correcting flow rate values Q computed with the empirical flow rate equation (1) with the flow rate computation circuit 5 using the correction coefficients, highly accurate flow rate computation becomes possible even when a pressure $P_2$ on the secondary side of a differential pressure type flowmeter changes under a vacuum.

Figure 4:
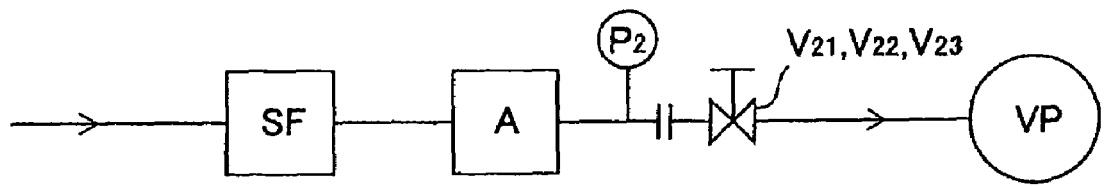
FIG. 4 shows a measurement circuit utilizes to obtain data in FIG. 3.

FIG. 4 illustrates a measurement circuit to obtain error correction coefficients in FIG. 3, for which a pressure type flow controller is employed for a standard flow controller SF, and a control valve $V_2$ is removably secured to change piping conditions on the secondary side, to adjust the flow rates of a supply gas ($N_2$ to be adjusted at 11 points) at an interval of 200 sccm over the flow rate range of 100 sccm-2000 sccm by using the standard flow controller SF, to measure $P_1$, $P_2$ and Q of a differential pressure type flowmeter A, and also to measure a pressure $P_2$ on the downstream side of an orifice each time adjustment is made.

Adjustments of the secondary side pipe resistance were made on 4 cases, that is, when no control valve $V_2$ is used (or when a differential pressure type flowmeter A is directly connected to a vacuum pump with an approximately 100 mm long pipe of an internal diameter of 4.35 mm $\phi$), when a control valve $V_2$ with the Cv value of 0.3 is used, when a control valve $V_2$ with the Cv value of 0.2 is used, and when a control valve $V_2$ with the Cv value of 0.1 is used.

As mentioned above, flow rates were measured at 11 points between 100 scm-2000 sccm.

Furthermore, errors (% SP) were computer as follows: (a flow rate value of SF—a flow rate value of A)/a flow rate value of SF·100%.

A supply pressure $p_1$ to a pressure type flow controller was approximately 300 kPaG, and the secondary side of an orifice of a differential pressure type flowmeter A was continuously evacuated by a vacuum pump Vp (300 liters/min and the maximum pressure achieved $1.2 \cdot 10^{-2}$ Torr).

For example, when a control valve $V_2$ was removed from the secondary side pipe, to form the secondary side pipe only with a straight stainless steel pipe of an internal diameter $\phi=4.35$ mm and a length L=100 mm, and a supply flow rate from a pressure type flow controller SF was made to be 1000 sccm, the measured value of a differential pressure type flowmeter A was approximately 100 sccm, thus an error having been zero and the secondary side pressure $P_2$ having been approximately 18 Torr. Similarly, assuming that a supply flow rate from the SF was 2000 sccm, the readout of a differential pressure type flowmeter A was 1920 sccm (an error E was−4% SF), and the secondary side pressure $P_2$ was approximately 29 Torr.

Similarly, by changing conditions of the secondary side pipe, it was found that, even under conditions that a supply flow rate from the SF was 2000 scm (100%), with Cv=0.3 the error E was −1% SF and $P_2$ was 34.5 Torr, with Cv=0.2 the error E was −0.05% SP and $P_2$ was 40.5 Torr, and with Cv=0.1 the error E was +2% SP and $P_2$ was 59.5 Torr.

Thus, from the results as shown in FIG. 3, a table has been established as below to show the association of changes of a pressure $P_2$ on the downstream side of an orifice and occurrence of errors (% SP) at all the set flow rate values (% SP).

TABLE 1

| Set Flow Rate % | Set value sccm | Pressure P2 on the downstream side of an orifice (Torr) | Error E (% SP) |
|---|---|---|---|
| 100 | 2000 | 29 | −4 |
| | | 34.5 | −1 |
| | | 40.5 | −0.05 |
| | | 59.5 | +2 |
| 50 | 1000 | 18.2 | 0 |
| | | 20.1 | +1.9 |
| | | 22.5 | +2.1 |
| | | 32.0 | +3.1 |

Namely, with a differential pressure type flowmeter to be used under the vacuum of less than approximately 100 Torr, correction data in the afore-shown Table 1 are utilized to correct actually measured values of the differential pressure type flowmeter in the event that a pressure $P_2$ on the secondary side of an orifice changed for any circumstances.

For example, if a differential pressure type flowmeter in use with 2000 sccm (100%) displays 2000 sccm for the measured value, and a pressure $P_2$ on the downstream side of an orifice is 60 Torr, it means that the measured value (2000 sccm) includes an error (% SP) of +2%. Then, the measured value of 2000 sccm is corrected to 1960 sccm by correcting for +2%.

Figure 5:
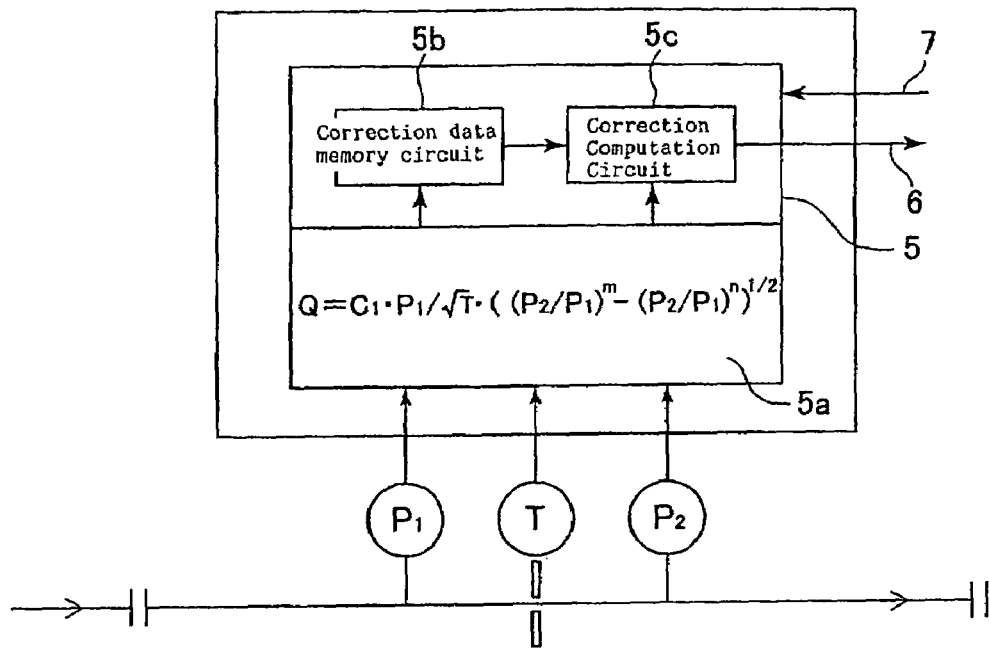
FIG. 5 is a basic block diagram of a differential pressure flowmeter according to the second embodiment of the present invention.

FIG. 5 illustrates a basic constitution of the present invention for which the aforementioned correction means is employed. That is, a control computation circuits 5 of a differential pressure type flowmeter in FIG. 1 showing the first embodiment is equipped with a correction data memory circuit 5b and a flow rate value correction computation circuit 5c.

Namely, a pressure $P_2$ on the downstream side of an orifice is referred to a flow rate value Q computed by using a flow rate empirical equation with the aforementioned flow rate computation circuit 5a, to draw out the error (% SP) with a pressure $P_2$ from the correction data memory circuit 5b, thus eliminating much of the error (% SP) from the aforementioned flow rate computation value Q and outputting, to an output terminal 6 to the outside, a flow rate value Q' close to vicinity of the value after correcting with the correction computation circuit 5c.

Figure 6:
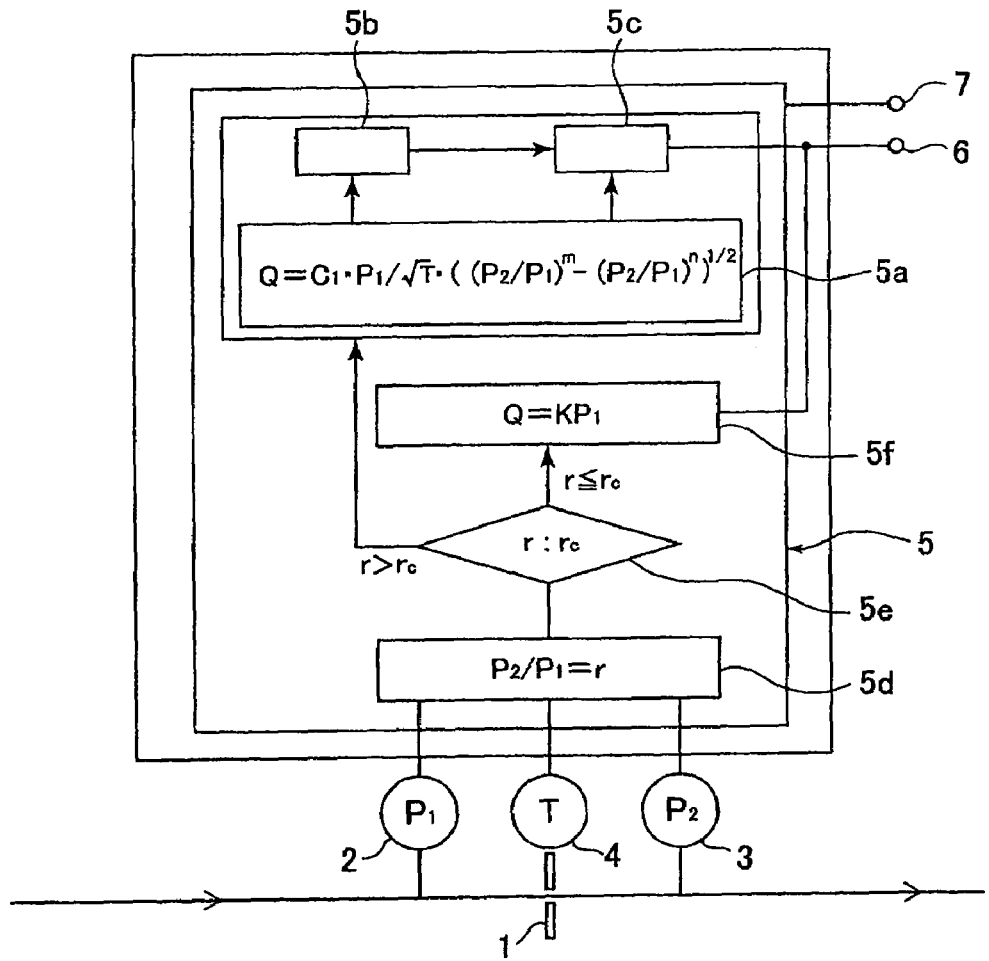
FIG. 6 is a basic block diagram of a differential pressure flowmeter according to the third embodiment of the present invention.

FIG. 6 illustrates the third embodiment of the present invention. With a differential pressure type flowmeter in FIG. 5, it is so made that a flow rate equation Q=KP$_1$ is used for computing a flow rate when it is under critical conditions, and a flow rate computation is performed with a control computation circuit 5 in FIG. 5 when it is under non-critical conditions.

Namely, as shown in FIG. 6, with a differential pressure type flowmeter in the third embodiment, a pressure ratio computation circuit 5d, a critical conditions judgment circuit 5e, and a flow rate computation circuit 5f for critical conditions are added to a control computation circuit 5 in FIG. 5. First, the ratio ($\gamma$) of a pressure $P_1$ on the upstream side of an orifice versus a pressure $P_2$ on the downstream side of an orifice is determined, and a pressure ratio ($\gamma$) and a critical pressure ration ($\gamma c$) are compared. And, a flow rate computation is performed with the equation Q=KP$_1$ when it is under critical conditions, to output the computed value.

When it is found to be under non-critical conditions, a flow rate is computed with the flow rate equation $$Q=C_1 \cdot P_1/\sqrt{T} \cdot ((P_2/P_t)^m - (P_2/P_1)^n)^{1/2}$$

After a computation value Q is corrected with the flow rate correction computation circuit 5c, a connected flow rate value Q' is outputted from the output terminal 6.

On the other hand, with the aforementioned first to third embodiments, even when the empirical flow rate equation is used, or the flow rate computation value Q is corrected for Q', the flow rate range of 100-10(%) is the limit to make possible retraining errors of flow rate measurement values to the range (for example, less than 1 (% SP)) bearable for practical use. When the flow rate is less than 10 (%). It becomes difficult to hold errors to less than 1 (% SP) even with a correction being performed.

Then, with the fourth embodiment of the present invention, it is so constituted that, by combining 2 differential pressure type flowmeters having different flow rate ranges according to the first to third embodiments, and switching the aforementioned 2 differential pressure type flowmeters for operation, accurate flow rate measurements have become possible over the wide flow rate range of 100(%)-1(%) as a whole, with errors of less than 1(% SP) all the time.

Figure 7:
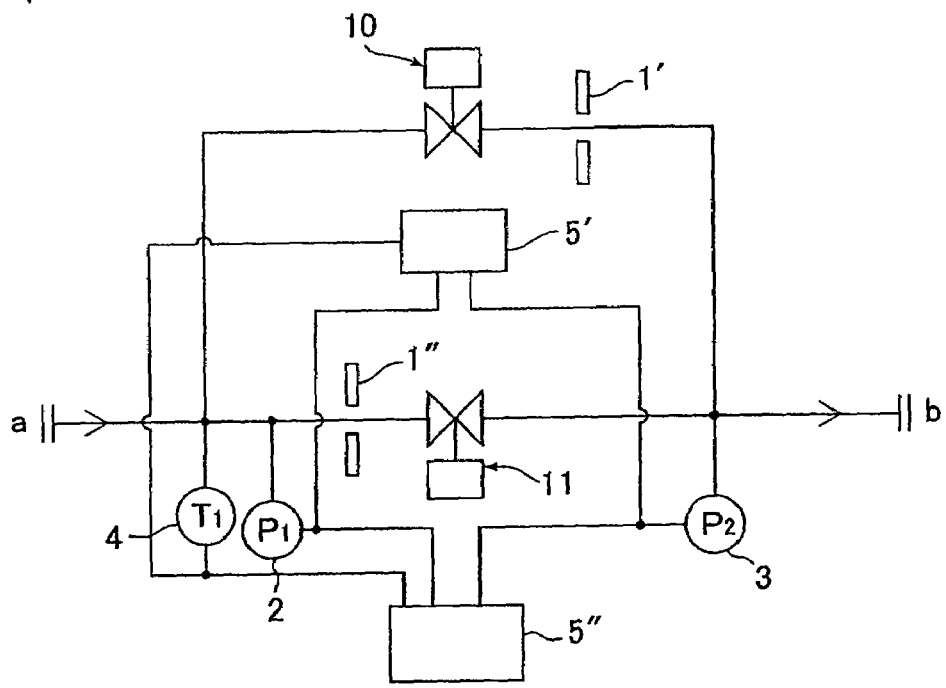
FIG. 7 is a system diagram to show the whole configuration of a differential pressure type flowmeter according to the fourth embodiment of the present invention.

FIG. 7 is a whole block diagram of a differential pressure type flowmeter according to the fourth embodiment. Referring to FIG. 7, 10 designates the No.1 switching valve (NC type), 11 the No.2 switching valve (NC type), a a gas inlet side, b a gas outlet side, 1' the No.1 orifice (for a small quantity), 1" the No.2 orifice (for a large quantity), 5' the No.1 control computation circuit, and 5" the No.2 control computation circuit.

Namely, a differential pressure type flow controller for a small flow quantity side (i.e., a flow rate range of 10-100 sccm) is formed with the No.1 orifice 1, the No.1 computation circuit 5' and the like, and a differential pressure type flow controller for a large flow quantity side (i.e., a flow rate range of 100-1000 sccm) is formed with the No.2 orifice 1', the No.2 computation circuit 5" and like. Therefore, highly accurate measurements of a flow rate can be achieved over the wide flow range of 1000 sccm(100%)-10 sccm (1%) with errors of less than 1 (% SP) by using both differential pressure type flow controllers.

Figure 8:
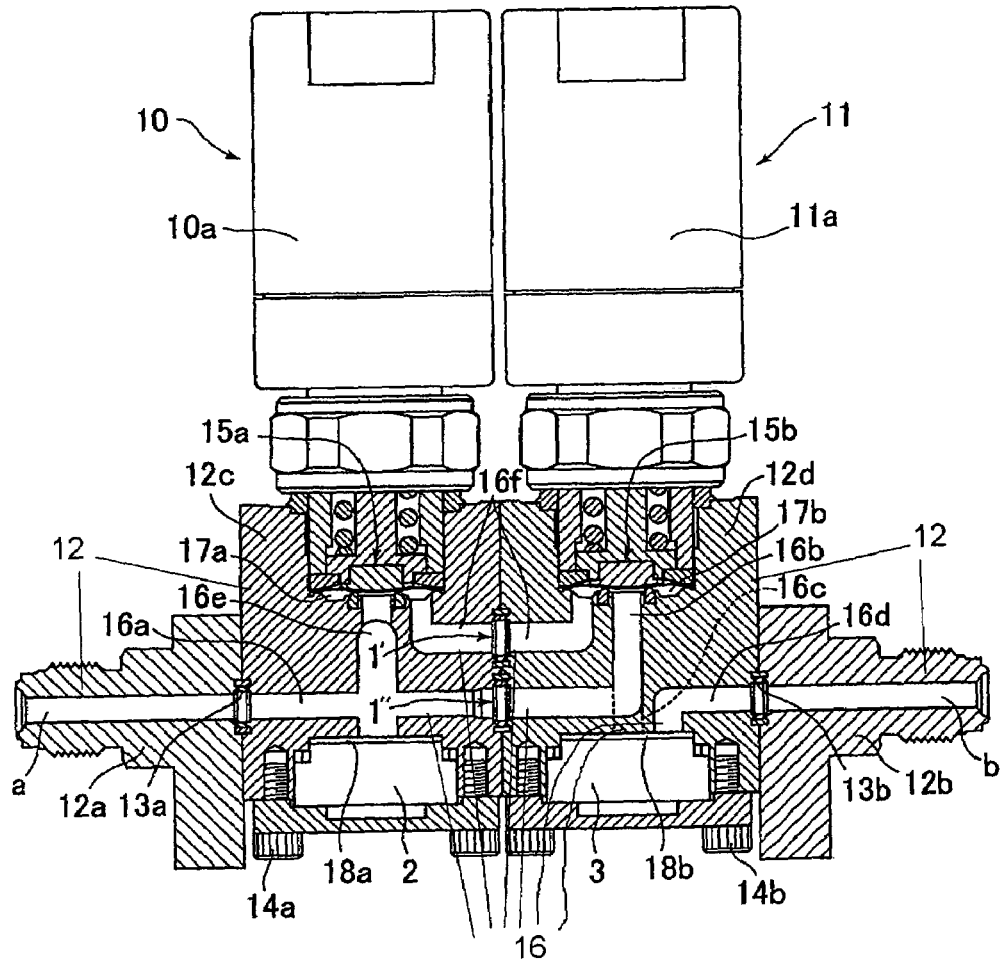
FIG. 8 is a cross-sectional schematic diagram of a major part of a differential pressure type flowmeter according to the fourth embodiment of the present invention.

FIG. 8 is a cross-sectional schematic diagram of a major part of a differential pressure type flowmeter according to the fourth embodiment of the present invention. It is to be noted that the No.1 and No.2 control computation circuits 5' and 5" and the like are omitted herewith.

Referring to FIG. 8, 12 designates a body, 13a and 13b seals, 14a a mounting bolt for an absolute type pressure detector 2 on the upstream side of an orifice, 14b a mounting bolt for an absolute type pressure detector 3 on the downstream side of an orifice, 15a and 15b diaphragm mechanisms, and 11a and 11b driving cylinders.

A body 12 made of stainless steel is formed by hermetically assembling a gas inlet element 12a, a gas element 12b, the No.1 body element 12c and the No.2 body element 12d.

On the upper sides of the block type No.1 body element 12c and No.2 body element 12d, there are made mounting holes 17a and 17b for the No.1 switching valve 10 and the No.2 switching valve 11 respectively. Furthermore, on the undersides thereof there are made mounting holes 18a and 18b for a pressure detector 2 on the upstream side of an orifice and a pressure detector 3 on the downstream side of an orifice respectively.

Though not shown in FIG. 8, a mounting hole for a gas temperature detector 4 on the upstream side of an orifice is formed on the No.1 body element 12c.

On the body elements 12c, 12d and the like, there are made fluid passages 16a, 16b and 16e for communication of a fluid inlet a, a fluid outlet b, the underside of a mounting hole 17a for the No.1 switching valve 10, the underside of a mounting hole 18b for a pressure detector 2 on the upstream side of an orifice and the underside of a mounting hole 17b for the No.2 switching valve 11; a fluid passage 16f for communication of the undersides of a mounting hole 17a and a mounting hole 17b; a fluid passage 16c for communication of the undersides of a mounting hole 17b and a mounting hole 18b; and a fluid passage 16d for communication of the underside of a mounting hole 18b and a fluid outlet b.

Furthermore, on a fluid passage 16, there is made an orifice 1' for a small flow quantity, and on a fluid passage 16a (or 16b), there is made an orifice 1" for a large flow quantity. With the embodiment in FIG. 8, there are arranged orifices 1' and 1" on the contacting faces of both body elements 12c and 12d.

The valve seats for communication of fluid passages 16e and 16d formed on the undersides of the aforementioned mounting holes 17a and 17b are made to open/close with valve mechanisms 15a and 15b for the No.1 switching valve 10 and No.2 switching valve 11. By opening and closing valve seats, opening and closing are performed between the passage 16e and passage 16f and also between the passage 16c and passage 16b.

It is so made that a passage 16c communicates between a mounting hole 17b and a mounting hole 18b all the time.

Referring to FIG. 7 and FIG. 8, first, in the event that a measured flow rate is in a large flow rate range, the No.1 switching valve 10 is made to close, while the No.2 switching valve 11 is made to open so that a gas flowed in from a gas inlet a is flowed out from a gas outlet through a passage 16a, an orifice 1", a passage 16b, a passage 16c and a passage 16d. Then, a flow rate computation is performed with the No.2 control computation circuit 5" (not illustrated) to be outputted to appropriate points.

In the event that the flow quantity range for measurements is reduced to be less than 10% of the rated flow rate, the No.1 switching valve 10 is made open while the No.2 switching valve 11 is made close so that a gas flows out from a gas outlet b through a passage 16a, a passage 16e, an orifice 1' for a small flow quantity, a passage 16f, a passage 16c and a passage 16d. Meantime, a flow rate computation is performed with the No.1 control computation circuit 5', to be outputted to appropriate points just same as in the case of measurements for a large flow quantity range.

Materials of a body 12, a treatment processing of the inner surface of a gas passage, diaphragm valve mechanisms 15a and 15b, pressure detectors 2 and 3, a temperature detector 4 and the like are publicly known so that explanations thereof are omitted herewith.

With the fourth embodiment in the afore-shown FIG. 7 and FIG. 8, the No.1 switching valve 10 and No.2 switching valve 11 are made to be valves of a normal close type, and it is so made that an operating fluid is supplied to driving cylinders 11a and 11b of switching valves 10 and 11 respectively via independent control electromagnetic valves. However, either one of the No.1 switching valve 10 and No.2 switching valve can be made to be a valve of a normal close type while the other is made to be a valve of a normal open type so that an operating fluid is supplied to both switching valves 10 and 11 from one control electromagnetic valve.

Figure 9:
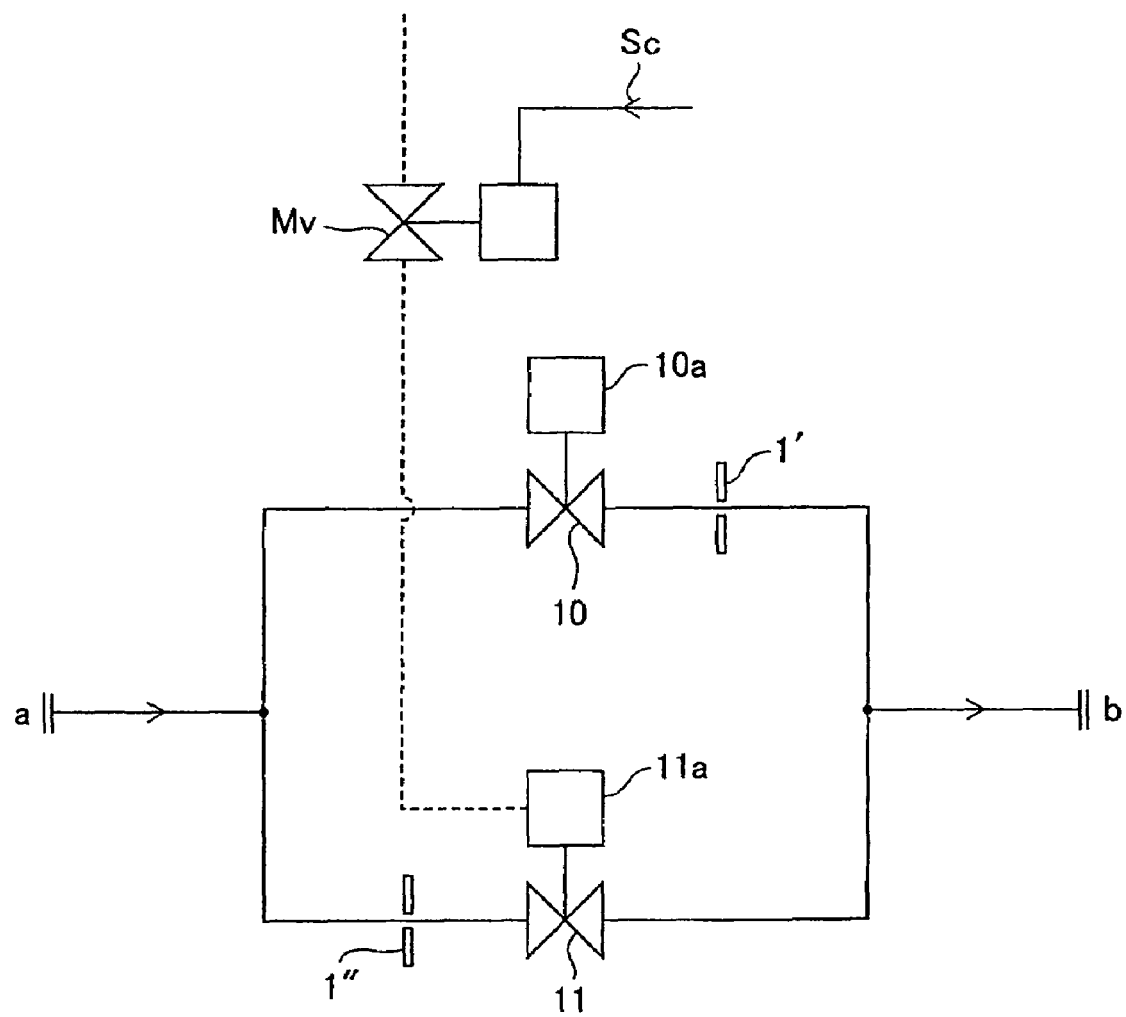
FIG. 9 is an explanatory drawing of a switching operation system of a differential pressure type flowmeter for which a normal open type switching valve and a normal close type switching valve are employed according to the present invention.

Namely, in the event that one of the switching valves 10 and 11 is made to be of a NO type while the other is made to be of a NC type as illustrated in a control system diagram of FIG. 9, switching operation for both switching valves 10 and 11 can be performed with one control electromagnetic valve Mv, and a control signal Sc can be made of one channel.

Figure 10:
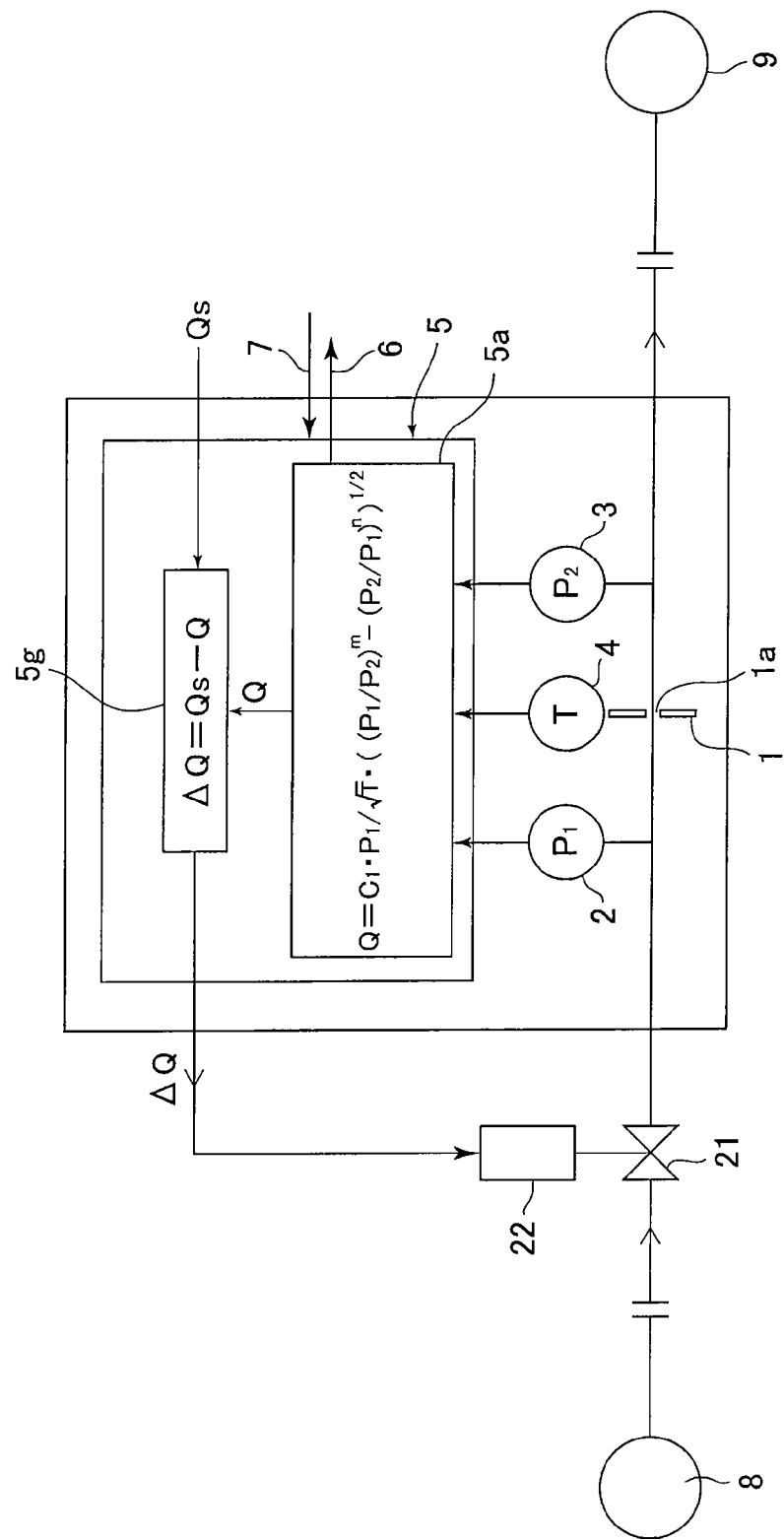
FIG. 10 is a basic block diagram of the first embodiment of a differential pressure type flow controller according to the present invention.

FIG. 10 illustrates the first embodiment of a differential pressure type flow controller according to the present invention. The aforementioned differential pressure type flowmeter shown in FIG. 1 is equipped with a control valve 21 and a valve driving part 22, and a control computation circuit 5 is equipped with a flow rate comparison circuit 5g whereat a flow rate difference ΔQ between a set flow rate Qs inputted from the outside and the computed flow rate Q computed with a flow rate computation circuit 5a is computed, thus the flow rate difference ΔQ being inputted to a valve driving part 22 as a control signal. With this performance, a control valve 21 is operated so that the aforementioned flow rate difference ΔQ is moved toward a zero direction, thus the gas flow rate passing through an orifice 1 being controlled to be a set flow rate Qs.

Figure 11:
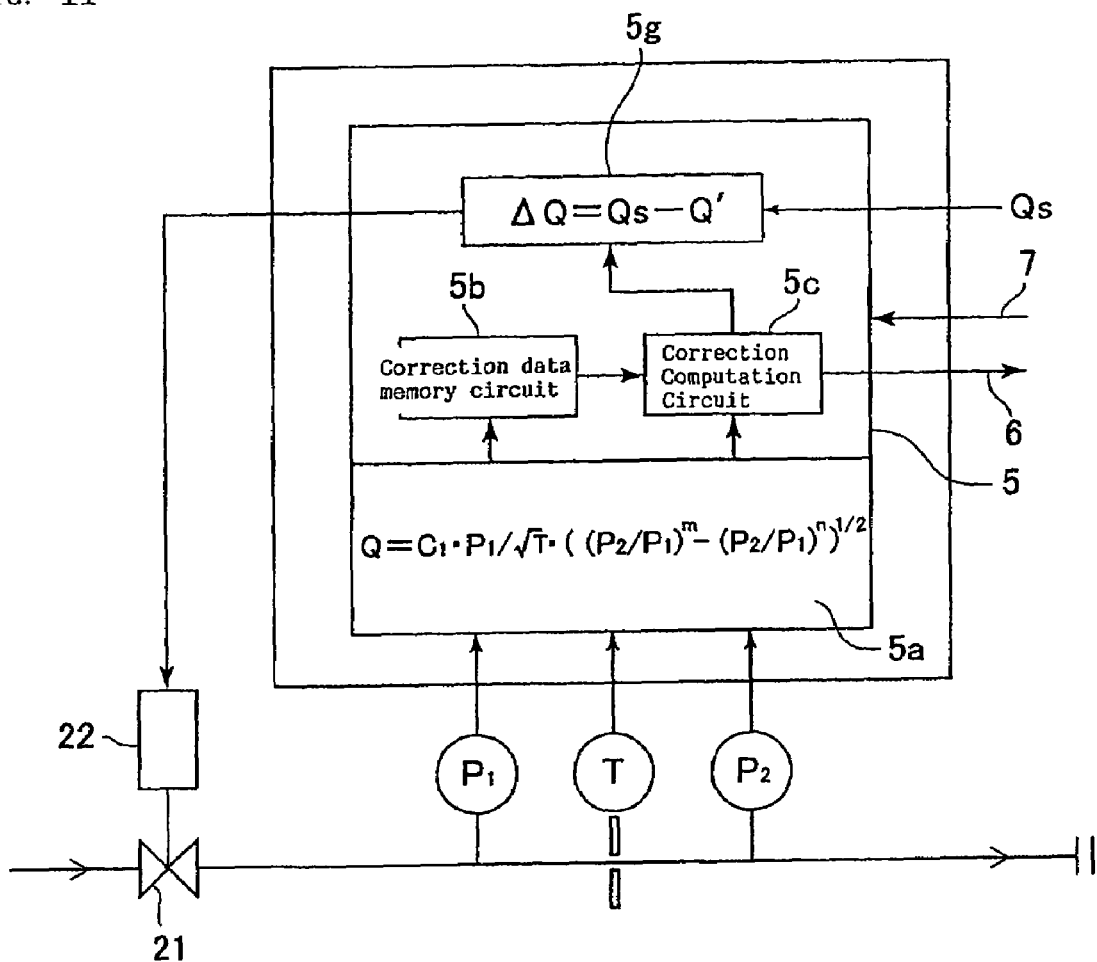
FIG. 11 is a basic block diagram of the second embodiment of a differential pressure type flow controller according to the present invention.

FIG. 11 illustrates the second embodiment of a differential pressure type flow controller. The aforementioned differential pressure type flow controller in FIG. 5 is equipped with a control valve 21 and a valve driving part 22, and a control computation circuit 5 is equipped with a flow rate comparison circuit 5g.

With the flow rate comparison circuit 5g, a flow rate difference ΔQ is computed by using the corrected flow rate Q' which has been error-corrected on the computed flow rate Q with the correction computation circuit, thus a control valve 21 being controlled by opening/closing toward to the direction where the flow rate difference ΔQ becomes zero.

Figure 12:
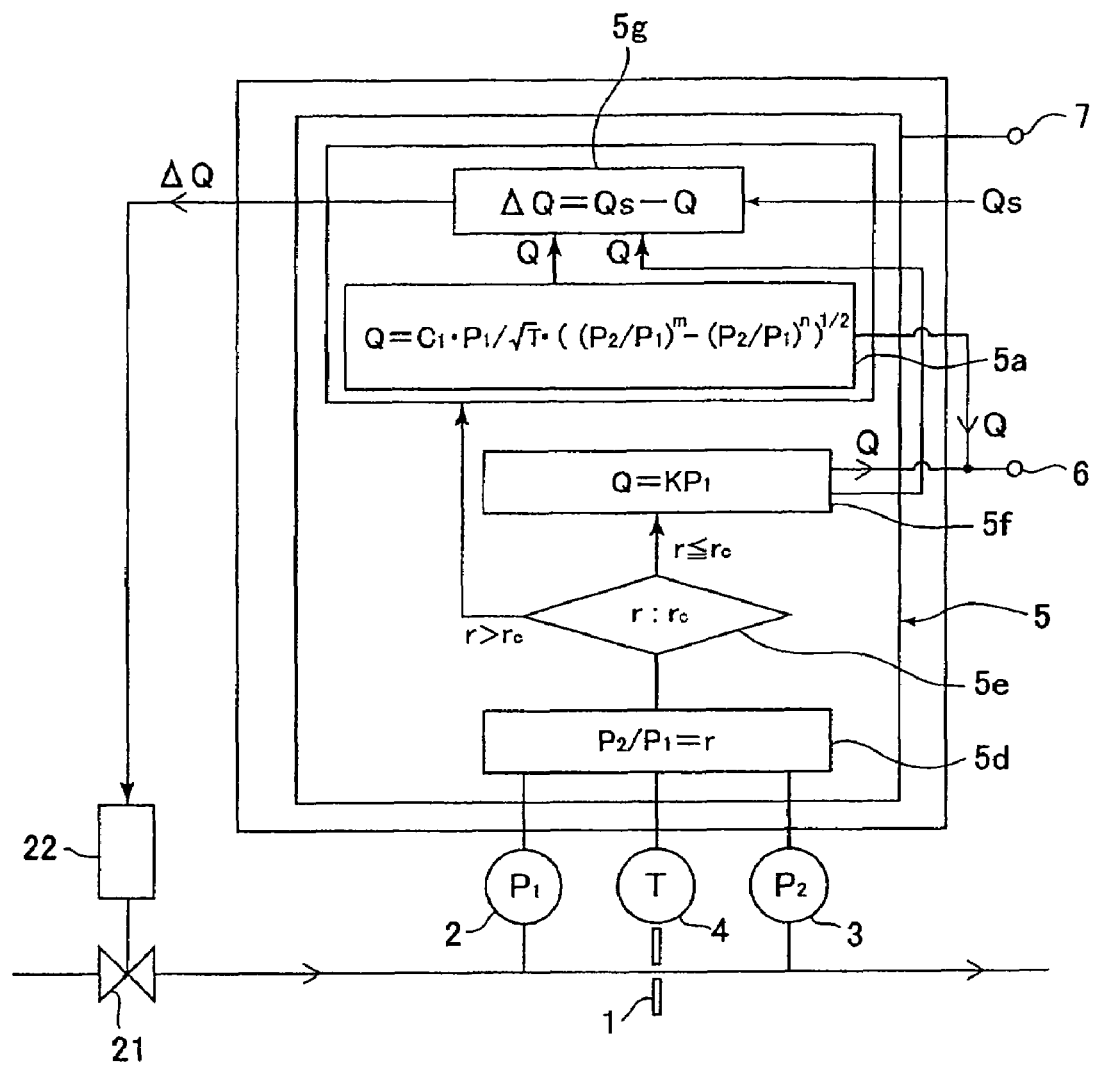
FIG. 12 is a basic block diagram of the third embodiment of a differential pressure type flow controller according to the present invention.

FIG. 12 illustrates the third embodiment of a differential pressure type flow controller. It is so constituted that the afore-mention differential pressure type flowmeter is equipped with a control valve 21 and a valve driving part 22, and a control computation circuit 5 is equipped with a flow rate comparison circuit 5g while a correction data memory circuit 5b and a correction computation circuit 5c are removed.

Namely, a flow rate difference ΔQ is computed by using the computed flow rate Q from the No.2 flow rate computation circuit 5f when the gas flow is under critical conditions, and a flow rate difference ΔQ is computed by using the computed flow rate Q from the No.1 flow rate computation circuit 5a when the gas flow is non-critical conditions so that a control valve 21 is controlled by opening/closing toward the direction where the flow rate difference ΔQ becomes zero.

Figure 13:
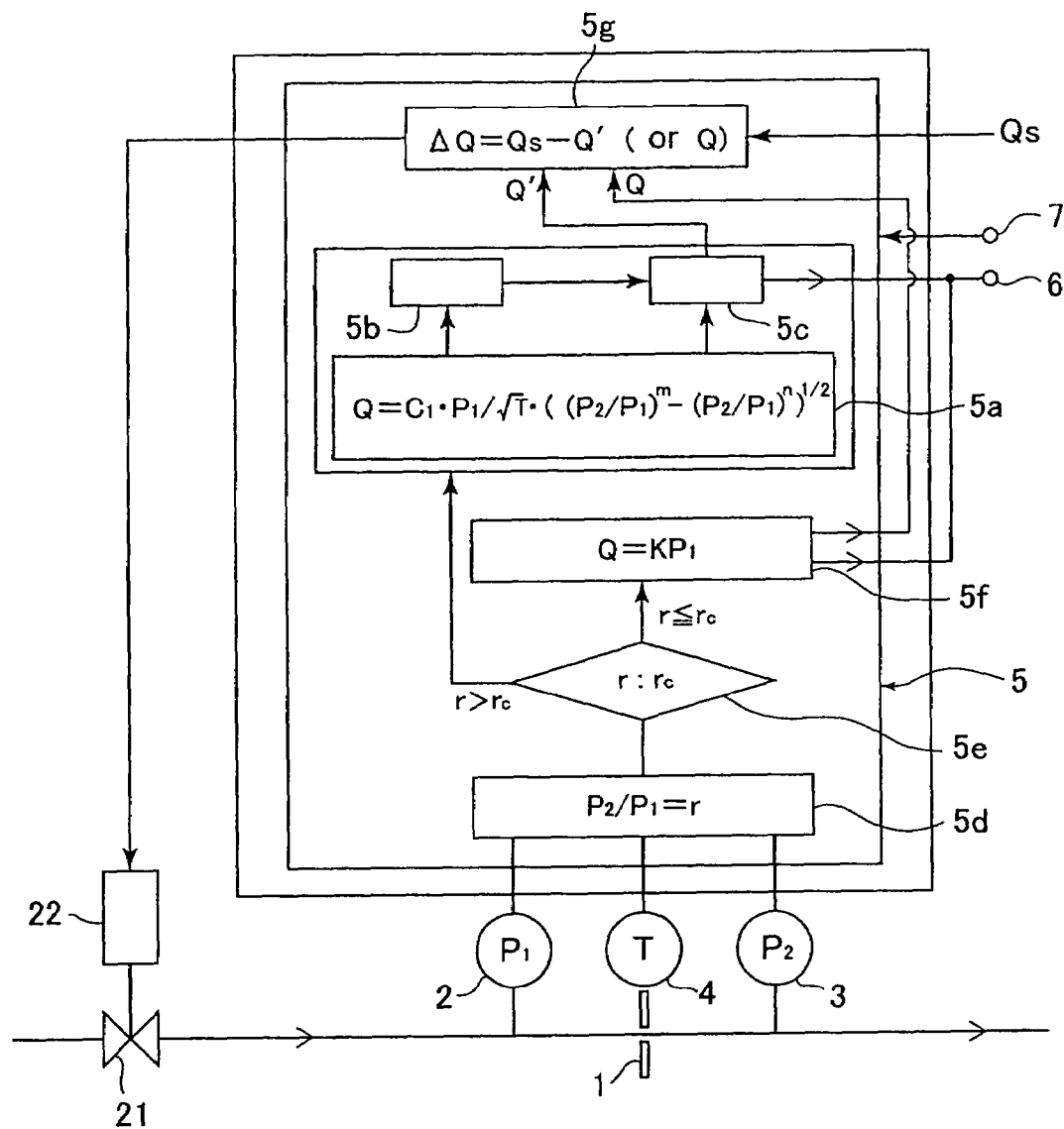
FIG. 13 is a basic block diagram of the fourth embodiment of a differential pressure type flow controller according to the present invention.
Figure 14:
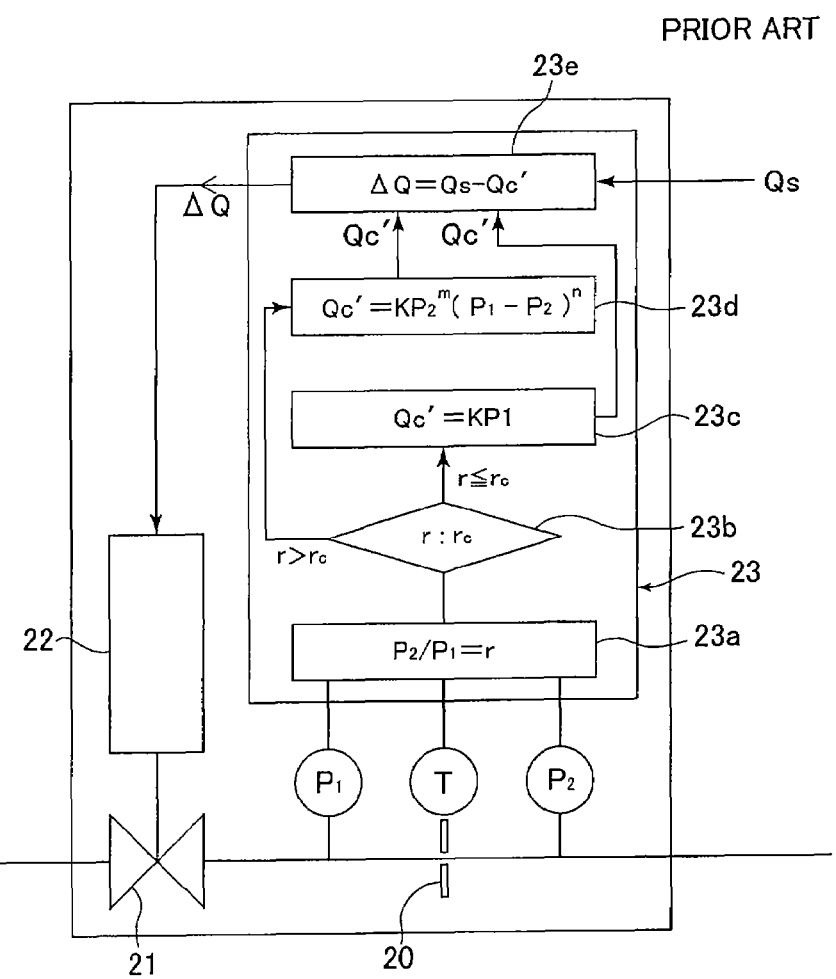
FIG. 14 is a block diagram of an improved pressure type flow controller disclosed previously.
Figure 15:
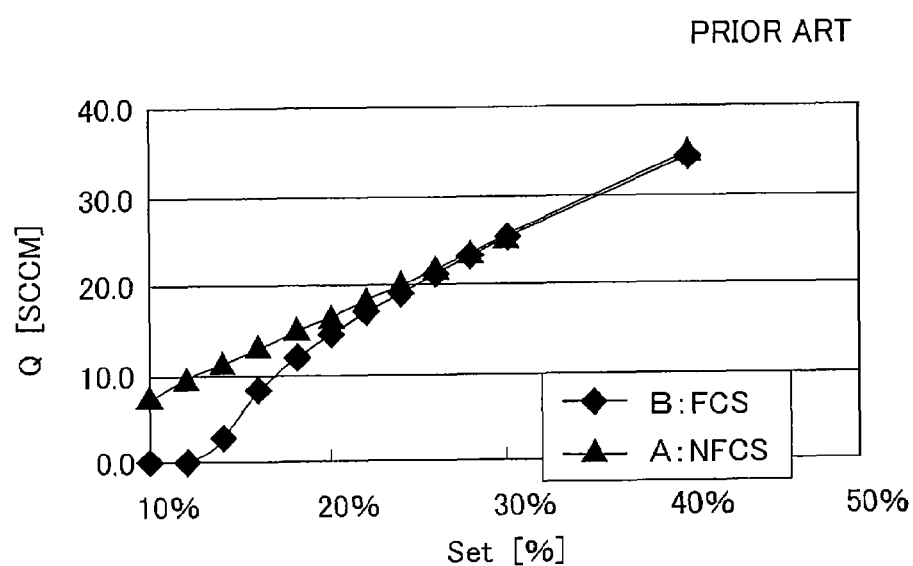
FIG. 15 is a diagram to show flow characteristics of an improved pressure type flow controller disclosed previously.

FIG. 13 illustrates the fourth embodiment of a differential pressure type flow controller. It is so constituted that the aforementioned differential pressure type flowmeter in FIG. 6 is equipped with a control valve 21 and a valve driving part 22, and a control computation circuit 5 is equipped with a flow rate comparison circuit 5g.

Namely, a flow rate difference ΔQ is computed by using the computed flow rate Q from the No.2 flow rate computation circuit 5f when the gas flow is under critical conditions, and a flow rate difference ΔQ is computed by using the flow rate Q' from the correction computation circuit 5c corrected to the computed flow rate Q from the flow rate computation circuit 5a so that a control valve 21 is controlled by opening/closing toward the direction where the flow rate difference ΔQ becomes zero.

FEASIBILITY OF INDUSTRIAL USE

The present invention is widely usable mainly for semiconductor manufacturing facilities, at chemical plants, food-produced processing plants and the like. It is also widely usable in the fields where fluids such as gases, liquids and the like are dealt with.

The invention claimed is:

1. A differential pressure type flowmeter characterized in that flow rate measurements are performed with high accuracy over a wide flow rate range by combining a first differential pressure type flowmeter for measuring a flow rate range of 100%-10% of the maximum flow rate range and a second differential pressure type flowmeter for measuring a flow rate range of 10%-1% of the maximum flow rate range, and by switching fluid to be measured in accordance with the aforementioned flow rate ranges using a switching valve, to supply fluid to the first and second differential pressure type flowmeters, wherein one of the first and second differential pressure type flowmeters is a differential pressure type flowmeter comprising:

an orifice;
a detector disposed to detect fluid pressure P1 on an upstream side of the orifice;
a detector disposed to detect fluid pressure P2 on a downstream side of the orifice;
a detector disposed to detect fluid temperature T on the upstream side of the orifice; and
a control computation circuit that computes a fluid's flow rate passing through the orifice with the pressure P1, wherein pressure P2 and temperature T are detected by the aforementioned detectors, and the fluid's flow rate Q is computed using equation $$Q=C1 \cdot P1\sqrt{T} \cdot ((P2/P1)^m-(P2/P1)^n)^{1/2},$$

where C1 is a proportional constant, and m and n are constant.

2. A differential pressure type flowmeter as claimed in claim 1, wherein the switching valve comprises a No.1 switching valve including a first driving cylinder and a No.2 switching valve including a second driving cylinder, wherein either one of the No.1 switching valve and the No.2 switching valve is a normal/close type valve and the other one is a normal/open type valve, and operating fluid is supplied from one control electromagnetic valve to the first driving cylinder and the second driving cylinder.

3. A differential pressure type flowmeter as claimed in claim 2, wherein the detector disposed to detect pressure on the upstream side of the orifice, the pressure detector disposed to detect pressure on the downstream side of the orifice, and the detector disposed to detect temperature on the upstream side of the orifice, are made sharable by both the first and second differential pressure type flowmeters.

4. A differential pressure type flowmeter comprising:

an orifice;
a detector disposed to detect fluid pressure P1 on an upstream side of the orifice;
a detector disposed to detect fluid pressure P2 on a downstream side of the orifice;
a detector disposed to detect fluid temperature T on the upstream side of the orifice; and
a control computation circuit that computes a fluid's flow rate Q passing through the orifice with the pressure P1 and pressure P2 and temperature T detected by the aforementioned detectors, wherein the control computation circuit is installed with a flow rate computation circuit employing an equation $$Q=C1 \cdot P1\sqrt{T} \cdot ((P2/P1)^m-(P2/P1)^n)^{1/2}$$

where C1 is a proportional constant, and m and n are constant, to compute fluid's flow rate Q, and further comprising a correction data memory circuit wherein changes in the pressure P2 on the downstream side of the orifice are obtained by actual measurements by the detector disposed to detect fluid pressure P2 on the downstream side of the orifice and flow rate errors of the fluid's flow rate are storable in the correction data memory circuit, and a flow rate correction computation circuit corrects computed fluid's flow rate Q with correction data from the correction data memory circuit, thus the computed fluid's flow rate Q is corrected depending on changes of pressure P2 on the downstream side of the orifice to output a corrected flow rate value.

5. A differential pressure type flowmeter as claimed in claim 4, wherein said control computation circuit further comprises a pressure ratio computation circuit that computes a ratio of the fluid pressure P1 on the upstream side of the orifice and the fluid pressure P2 on the downstream side of the orifice;

a critical condition judgment circuit that judges a state of fluid by comparing the computed pressure ratio and a fluid's critical pressure ratio; and a No.2 flow rate computation circuit that computes fluid's flow rate Q by using equation Q=KP1, where K is a proportional constant, when fluid is under critical conditions, thus outputting the fluid's flow rate Q computed with the No.2 flow rate computation circuit when fluid is under critical conditions, and also outputting a fluid's flow rate value Q' corrected using the flow rate correction computation circuit when fluid is under non-critical conditions.

6. A differential pressure type flowmeter characterized in that flow rate measurements are performed with high accuracy over a wide flow rate range by combining a first differential pressure type flowmeter for measuring a flow rate range of 100%-10% of the maximum flow rate range and a second differential pressure type flowmeter for measuring a flow rate range of 10%-1% of the maximum flow rate range, and by switching a fluid to be measured in accordance with the aforementioned flow rate ranges using a switching valve, to supply the fluid to the first and second differential pressure type flowmeters, wherein one or both of the first and second differential pressure type flowmeters is a differential pressure type flowmeter according to claim 5.

7. A differential pressure type flowmeter characterized in that flow rate measurements are performed with high accuracy over a wide flow rate range by combining a first differential pressure type flowmeter for measuring a flow rate range of 100%-10% of the maximum flow rate range and a second differential pressure type flowmeter for measuring a flow rate range of 10%-1% of the maximum flow rate range, and by switching fluid to be measured in accordance with the aforementioned flow rate ranges using a switching valve, to supply fluid to the first and second differential pressure type flowmeters, wherein one or both of the first and second differential pressure type flowmeters is a differential pressure type flow meter according to claim 4.

8. A differential pressure type flowmeter comprising
   (a) a valve body comprising
      i. a fluid inlet;
      ii. a fluid outlet;
      iii. a first mounting hole, for a No.1 switching valve, formed in the valve body;
      iv. a second mounting hole, for a No.2 switching valve 11, formed in the valve body;
      v. a third mounting hole, for a fluid pressure detector disposed on an upstream side of an orifice, formed in the valve body;
      vi. a fourth mounting hole for a fluid pressure detector disposed on a downstream side of the orifice, formed in the valve body;
      vii. a fifth mounting hole, for a fluid temperature detector disposed on the upstream side of the orifice, formed in the valve body;
      viii. first, second and third fluid passages disposed to pass fluid from the fluid inlet through the valve body, wherein undersides of the first mounting hole for the No.1 switching valve 10, the third mounting hole for the fluid pressure detector disposed on the upstream side of the orifice and the second mounting hole for the No.2 switching valve are made in an interior of the valve body 12;
      ix. a fourth fluid passage disposed to communicate with the underside of the first mounting hole for the No.1 switching valve and the underside of the second mounting hole for the No.2 switching valve;
      x. a fifth fluid passage disposed to communicate with the underside of the second mounting hole for the No.2 switching valve and the underside of the fourth mounting hole for the fluid pressure detector disposed on the downstream side of the orifice; and
      xi. a sixth fluid passage disposed to communicate with the underside of the fourth mounting hole for the pressure detector disposed on the downstream side of the orifice and the fluid outlet;
   (b) the fluid pressure detector disposed on the upstream side of the orifice and fixed to the third mounting hole;
   (c) the fluid pressure detector disposed on the downstream side of the orifice and fixed to the fourth mounting hole;
   (d) the fluid temperature detector disposed on the upstream side of the orifice and fixed to the fifth mounting hole;
   (e) the No.1 switching valve fixed to the first mounting hole, wherein the No.1 switching valve conducts opening and closing between the third fluid passage and the fourth fluid passage;
   (f) the No.2 switching valve fixed to the second mounting hole, wherein the No.2 switching valve conducts opening and closing between the second fluid passage and the fifth fluid passage, wherein the orifice comprises an orifice for small flow quantity installed halfway on the fourth fluid passage and an orifice for large flow quantity installed on the first fluid passage or on the second fluid passage, and a control computation circuit computes fluid's flow rate Q passing through the orifice for small flow quantity and the orifice for large flow quantity depending on pressure P1, pressure P2 and temperature T detected by the aforementioned fluid pressure detectors and the temperature detector 4, respectively using equation $$Q = C1 \cdot P1/\sqrt{T} \cdot ((Pb\ 2/P1)^m - (P2/P1)^n)^{1/2}$$

where C1 is a proportional constant, and m and n are constants, so that when making it possible a flow rate measured by the differential pressure type flowmeter is in a large flow quantity range the No.1 switching valve is closed and the No.2 switching valve is opened, and when a flow rate measured by the differential pressure type flowmeter is in a small quantity range the No.1 switching valve is opened and the No.2 switching valve is closed.

9. A differential pressure type flowmeter as claimed in claim 8, wherein when the differential pressure type flowmeter measures flow rate range up to 100%-10% of the maximum flow rate then the No.1 switching valve 10 is closed and the No.2 switching valve is opened, and when the differential pressure type flowmeter measures a flow rate up to 10%-1% of the maximum flow rate then the No.1 switching valve is opened and the No.2 switching valve is closed.

10. A differential pressure type flowmeter as claimed in claim 8, wherein either one of the No.1 switching valve and the No.2 switching valve is a normal/close type valve comprising a first driving cylinder and the other one is a normal/open type valve comprising a second driving cylinder, and operating fluid is supplied from one control electromagnetic valve to the first driving cylinder and the second driving cylinder.

11. A differential pressure type flow controller comprising:
   a control valve part equipped with a valve driving part;
   an orifice installed on a downstream side of the control valve part;
   a detector disposed to detect fluid pressure P1 on an upstream side of the orifice;
   a detector disposed to detect fluid pressure P2 on a downstream side of the orifice;
   a detector disposed to detect fluid temperature T on the upstream side of the orifice; and
   a control computation circuit equipped with a flow rate comparison circuit that computes fluid's flow rate Q using pressure P1, pressure P2 and temperature T detected by the aforementioned detectors, and a difference between the computed flow rate Q and a set flow rate Qs is computed by the control computation circuit, and the control computation circuit is equipped with a flow rate computation circuit that computes fluid's flow rate Q using equation $$Q=C1 \cdot P_1 \sqrt{T} \cdot ((P2/P1)^m \cdot (P2/P1)^n)^{1/2},$$

where C1 is a proportional constant, and m and n are constants, and further comprising a correction data memory circuit wherein changes of the pressure P2 on the downstream side of the orifice are obtained by actual measurements by the detector disposed to detect pressure P2 on the downstream side of the orifice and flow rate errors of the fluid's flow rate Q are storable in the correction data memory circuit, and the flow rate correction computation circuit corrects the computed fluid's flow rate Q using correction data from the correction data memory circuit, thus the fluid's flow rate Q is corrected depending on changes of pressure P2 on the downstream side of the orifice, and the corrected flow rate value Q' is inputted to the flow rate comparison circuit to compute a difference of flow rates $$\Delta Q = Q' - Qs.$$

12. A differential pressure type flow controller as claimed in claim 11, wherein the control computation circuit further comprises
   a pressure ratio computation circuit that computes a pressure ratio of fluid pressure P1 on the upstream side of the orifice and fluid pressure P2 on the downstream side of the orifice;
   a critical conditions judgment circuit that judges a state of fluid by comparing the computed pressure ratio and a fluid's critical pressure ratio; and
   a No.2 flow rate computation circuit that computes fluid's flow rate Q using equation Q=KP1, where K is a proportional constant, when fluid is under critical conditions, and then the fluid's flow rate Q computed by the No.2 fluid computation circuit when the fluid is under critical conditions and a fluid's corrected flow rate value Q' from the flow rate correction computation circuit when the fluid is under non-critical conditions are inputted respectively to the flow rate computation circuit.

13. A differential pressure type flowmeter characterized in that flow rate measurements are performed with high accuracy over a wide flow rate range by combining a first differential pressure type flowmeter for measuring a flow rate range of 100%-10% of the maximum flow rate range and a second differential pressure type flowmeter for measuring a flow rate range of 10%-1% of the maximum flow rate range, and by switching fluid to be measured in accordance with the aforementioned flow rate ranges using a switching valve, to supply fluid to the first and second differential pressure type flowmeters, wherein each of the first and second differential pressure type flowmeter comprises:
   an orifice;
   a detector disposed to detect fluid pressure P1 on an upstream side of the orifice;
   a detector disposed to detect fluid pressure P2 on a downstream side of the orifice;
   a detector disposed to detect fluid temperature T on the upstream side of the orifice; and
   a control computation circuit that computes a fluid's flow rate by using pressure P1, pressure P2, and temperature T detected by the aforementioned detectors, and the fluid's flow rate Q is computed by the control computation circuit using equation $$Q=C1 \cdot P_1 \sqrt{T} \cdot ((P2/P1)^m - (P2/P1)^n)^{1/2}$$

where C1 is a proportional constant, and m and n are constants.

14. A differential pressure type flowmeter as claimed in claim 13, wherein the detector disposed to detect pressure on the upstream side of the orifice, the detector disposed to detect pressure on the downstream side of the orifice, and the detector disposed to detect a temperature on the upstream side of the orifice, are made sharable by both the first and the second differential pressure type flowmeters.

15. A differential pressure type flowmeter characterized in that flow rate measurements are performed with high accuracy over a wide flow rate range by combining a first differential pressure type flow meter for measuring a flow rate range of 100%-10% of the maximum flow rate range and a second differential pressure type flowmeter for measuring a flow rate range of 10%-1% of the maximum flow rate range, and by switching fluid to be measured in accordance with the aforementioned flow rate ranges using a switching valve, to supply fluid to the first and second differential pressure type flowmeters, wherein each of the first and second differential pressure type flowmeters is a differential pressure type flowmeter comprising:
   an orifice;
   a detector disposed to detect fluid pressure P1 on an upstream side of the orifice;
   a detector disposed to detect fluid pressure P2 on a downstream side of the orifice;
   a detector disposed to detect fluid temperature T on the upstream side of the orifice; and
   a control computation circuit that computes a fluid's flow rate using pressure P1, pressure P2, and temperature T detected by the aforementioned detectors, and the control computation circuit is equipped with a flow rate computation circuit that computes fluid's flow rate Q using equation $$Q=C1 \cdot P_1 \sqrt{T} \cdot ((P2/P1)^m - (P2/P1)^n)^{1/2}$$

where C1 is a proportional constant, and m and n are constants, and further comprising a correction data memory circuit wherein changes of pressure P2 on the downstream side of the orifice are obtained by actual measurement by the detector disposed to detect fluid pressure P2 on the downstream side of the orifice, and flow rate errors of the fluid's flow rate are storable in the correction data memory circuit, and a flow rate correction computation circuit corrects the computed fluid's flow rate Q using correction data from the correction data memory circuit, thus computed fluid's flow rate Q is corrected depending on changes of pressure P2 on the downstream side of the orifice to output a corrected flow rate Q'.

* * * * *